(12) United States Patent
Milford et al.

(10) Patent No.: US 8,267,309 B1
(45) Date of Patent: *Sep. 18, 2012

(54) INTERACTIVE DEVICE USING CAPACITIVE SENSOR ARRAY FOR JOINT PAGE IDENTIFICATION AND PAGE LOCATION DETERMINATION

(75) Inventors: Peter Milford, Los Gatos, CA (US);
Mark Flowers, Los Gatos, CA (US)

(73) Assignee: Leapfrog Enterprises, Inc., Emeryville, CA (US)

( * ) Notice: Subject to any disclaimer, the term of this patent is extended or adjusted under 35 U.S.C. 154(b) by 182 days.

This patent is subject to a terminal disclaimer.

(21) Appl. No.: 12/625,456

(22) Filed: Nov. 24, 2009

Related U.S. Application Data

(63) Continuation of application No. 11/187,386, filed on Jul. 21, 2005, now Pat. No. 7,621,441, which is a continuation-in-part of application No. 11/023,316, filed on Dec. 22, 2004, now Pat. No. 7,428,990.

(51) Int. Cl.
*G06K 19/06* (2006.01)
(52) U.S. Cl. ........................... 235/375; 235/492
(58) Field of Classification Search .................. 235/439, 235/440, 492, 375, 451, 380, 382; 434/317, 434/178, 365
See application file for complete search history.

(56) References Cited

U.S. PATENT DOCUMENTS

| | | | |
|---|---|---|---|
| 4,650,426 A | 3/1987 | Brigance | |
| 4,990,092 A | 2/1991 | Cummings | |
| 5,356,296 A | 10/1994 | Pierce et al. | |
| 5,359,374 A | 10/1994 | Schwartz | |
| 5,437,552 A | 8/1995 | Baer et al. | |
| 5,453,013 A | 9/1995 | Billings et al. | |
| 5,511,980 A | 4/1996 | Wood | |
| 5,531,600 A | 7/1996 | Baer et al. | |
| 5,541,888 A | 7/1996 | Russell | |
| 5,810,604 A | 9/1998 | Kopp, Jr. et al. | |
| 6,064,855 A | 5/2000 | Ho | |
| 6,167,233 A | 12/2000 | Gresser, Jr. et al. | |
| 6,234,031 B1 | 5/2001 | Suga | |
| 6,502,756 B1 | 1/2003 | Fahraeus | |
| 6,608,618 B2 | 8/2003 | Wood et al. | |
| RE38,286 E | 10/2003 | Flowers | |

(Continued)

FOREIGN PATENT DOCUMENTS

WO 0073983 12/2000

(Continued)

OTHER PUBLICATIONS

Freescale Semiconductor, Inc., "Advanced Information, Electric Field Imaging Device 33794," www.freescale.com, Apr. 2004, Entire Document.

(Continued)

*Primary Examiner* — Thien M Le

(57) ABSTRACT

An interactive media device. The device has an area for receiving a document and a sensor network adjacent to the area. The sensor network has a first region adjacent to the document and responsive to user proximity to the first region. The sensor network has a second region that is responsive to markers disposed on or embedded in the document. The device has a processor coupled to the sensor network and able to receive signals from the sensor network indicating capacitance change in the first and second regions based on the received signals. The processor is thus able to identify a location in the document based on the first and second received signals.

17 Claims, 21 Drawing Sheets

U.S. PATENT DOCUMENTS

| | | | |
|---|---|---|---|
| 6,641,401 B2 | 11/2003 | Wood et al. | |
| 6,661,405 B1 | 12/2003 | Flowers | |
| 6,668,156 B2 | 12/2003 | Lynch et al. | |
| 6,729,543 B1 | 5/2004 | Arons et al. | |
| 6,750,978 B1 | 6/2004 | Marggraff et al. | |
| 6,932,609 B1 | 8/2005 | Bozek | |
| 6,966,495 B2 | 11/2005 | Lynggaard et al. | |
| 7,111,774 B2 | 9/2006 | Song | |
| 7,428,990 B1 * | 9/2008 | Milford et al. | 235/439 |
| 7,621,441 B1 * | 11/2009 | Milford et al. | 235/375 |
| 2004/0043365 A1 | 3/2004 | Kelley et al. | |
| 2004/0043371 A1 | 3/2004 | Ernst et al. | |
| 2004/0219501 A1 | 11/2004 | Small et al. | |
| 2006/0071912 A1 | 4/2006 | Hill et al. | |
| 2007/0190511 A1 | 8/2007 | Ernst et al. | |

FOREIGN PATENT DOCUMENTS

| | | |
|---|---|---|
| WO | 0101670 | 1/2001 |
| WO | 0116691 | 3/2001 |
| WO | 0126032 | 4/2001 |
| WO | 0171473 | 9/2001 |
| WO | 0171475 | 9/2001 |
| WO | 0175723 | 10/2001 |
| WO | 0175773 | 10/2001 |
| WO | 0175780 | 10/2001 |
| WO | 0195559 | 12/2001 |

OTHER PUBLICATIONS

Freescale Semiconductor, Inc., "Touch Panel Applications Using the MC33794 E-Field IC," www.freescale.com, Dec. 2003, Entire Document.

* cited by examiner

INTERACTIVE DEVICE USING CAPACITIVE SENSOR ARRAY FOR JOINT PAGE IDENTIFICATION AND PAGE LOCATION DETERMINATION

RELATED APPLICATION

This application is a Continuation of co-pending commonly-owned U.S. patent application Ser. No. 11/187,386, filed Jul. 21, 2005, entitled "Interactive Device Using Capacitive Sensor Array for Joint Page Identification and Page Location Determination" by Milford et al., and claims the benefit and priority thereto. The U.S. patent application Ser. No. 11/187,386 is incorporated herein by reference in its entirety.

The U.S. patent application Ser. No. 11/187,386 is a Continuation-in-Part of co-pending commonly-owned U.S. patent application Ser. No. 11/023,316, filed Dec. 22, 2004, entitled "Capacitive Sensing of Media Information in an Interactive Media Device" by Milford et al., and claims the benefit and priority thereto. The U.S. patent application Ser. No. 11/023,316 is incorporated herein by reference its entirety.

FIELD OF THE INVENTION

Embodiments of the present invention relate to the field of electronic circuits. Specifically, embodiments of the present invention relate to joint identification of document pages and location of user interaction with the document using capacitive sensing.

BACKGROUND ART

There are a variety of interactive electronic media devices in which a medium such as a book is placed on or in a device platform. The platform may include a detection system able to determine the portion of the book to which the user points. The platform then generates an appropriate response to the user. Such interactive books are sometimes known as "talking books," although more generally an interactive book may use audio and visual outputs to interact with a user. Typically, an interactive media device provides an audio output related to a position on a printed page. For example, an interactive media device for children may speak the names of words that the child points to with a stylus. As another example, the interactive media device initiates a game when the child points at a picture. Although interactive media device are commonly sold as children's toys, they also have numerous other potential applications as well, for example, providing an interactive media experience to a user.

Thus, in order to interact with the user, the interactive media device must know what book or other document is in the device, what page or pages are currently facing the user, and to which portion of the page the user is pointing. Typically, the cost of the components needed to learn all of this information is quite high. Moreover, other problems exist with conventional solutions to learn this information.

One technique for identifying a location to which a user is referring in an interactive media device is an array of switches disposed in the device below the document. U.S. Pat. No. 6,608,618 to Woods et al. discloses pressure sensitive switches having upper and lower conductive regions not in contact absent applied pressure. When a user applies pressure to a switch, the device detects the closing of an electrical circuit. While such a technique is effective, a less expensive technique is desirable.

Another technique for identifying a location to which a user is referring in an interactive media device is an electrographic sensing system comprising antennas. U.S. Pat. No. 6,661,405 to Flowers discloses a technique comprising an antenna system and signal strength detector. Different voltages are applied to different areas of the antenna system, such that position is detectable based on signal strength. For example, the user touches or nearly touches the device with a stylus that is electrically coupled to a processor. Based on the strength of signal from the antennas, the processor determines the location to which the user is pointing. This technique is effective; however, it requires the use of a stylus or other component to read the signal strength. Also, a less expensive technique is desirable.

As previously discussed, the interactive media device must also know the page of the document that currently faces the user. Some conventional devices require the user to contact a region of the page to allow the device to know which page is being displayed. Typically, the user point to or touches the stylus to a symbol on the page. A drawback of this technique is that the user must remember to point to particular symbol on each page of the device so that the output can be correctly associated with the symbols and text on a particular page. If the user forgets to touch the pointer to the required symbol, the interactive media device will not know which page is open. Thus if a child fails to touch the symbol after turning the page, the child is confronted with audio signals and other feedback that do not correspond to the content of the current page, which reduces the interactive experience for the child.

SUMMARY OF THE INVENTION

Therefore, it would be advantageous to provide a method and device for identifying a particular page or pages of a document facing a user and the location on the page to which a user is pointing or otherwise indicating. It would be further advantageous if the detection of the particular page of the document is automatic, for example, without user intervention. It would be still further advantageous if the detection of the page and the identification of the location on the page are implemented economically, e.g., using the same an analogous detection technique.

Accordingly, embodiments of the present invention provide methods and devices that automatically identify a document in or on an interactive media device and the location of the document to which a user is pointing or otherwise indicating. Embodiments of the present invention automatically detect the document and the particular page or pages in the document that is facing the user. Embodiments of the present invention are implemented with economical components. Embodiments of the present invention provide these advantages and others not specifically mentioned above but described in the sections to follow.

An embodiment of the present invention is directed to an interactive media device. The device comprises an area for receiving a document and a sensor network adjacent to the area. The sensor network has a first region adjacent to the document and responsive to user proximity to the first region. The sensor network has a second region that is responsive to markers disposed on or embedded in the document. The device has a processor coupled to the sensor network and able to receive signals from the sensor network indicating capacitance change in the first and second regions based on the received signals. The processor is thus able to automatically identify a location in the document based on the first and second received signals.

Another embodiment in accordance with the present invention is directed to a method performed in an interactive media device of detecting a user-indicated location in a multi-page document. The method comprises receiving first signals that are a function of capacitance of a first region of a sensor network. A pattern of page markers embedded on or disposed on the document is determined based on the first received signals. Based on the pattern, a page of the document is identified. Also received are second signals that are a function of capacitance of a second region of the sensor network. The second signals are indicative of user proximity, e.g., via a finger or pointing device, to a particular sensor in the second region. Based on the second received signals, the user-indicated location in the multi-page document is identified.

Another embodiment of the present invention is directed to an apparatus for joint detection of a facing page of a document and a user-indicated location on the facing page. The apparatus has a surface for receiving the document. The apparatus further has sensors for detecting user proximity to at least one of the sensors and for detecting markers disposed on or embedded in the document. User proximity may include a finger, or pointing device, or pen. Furthermore, the apparatus has a processor coupled to the sensors. The processor reads signals output from the sensors and identifies the facing page (page detection) based on a pattern of the markers and identifies the user-indicated location (page location detection) on the facing page based on the at least one sensor. In one embodiment, a similar detecting technique is employed for both the page detection and the page location detection.

Yet another embodiment is a directed to an apparatus for detecting information related to a document. The apparatus has a sensor array for generating signals used to identify a facing page of the document and is also used to detect user proximity to a location of the facing page. The apparatus has a processor coupled to the sensor array to receive the signals and, in response thereto, automatically identifies the facing page and the location.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Figure 1:
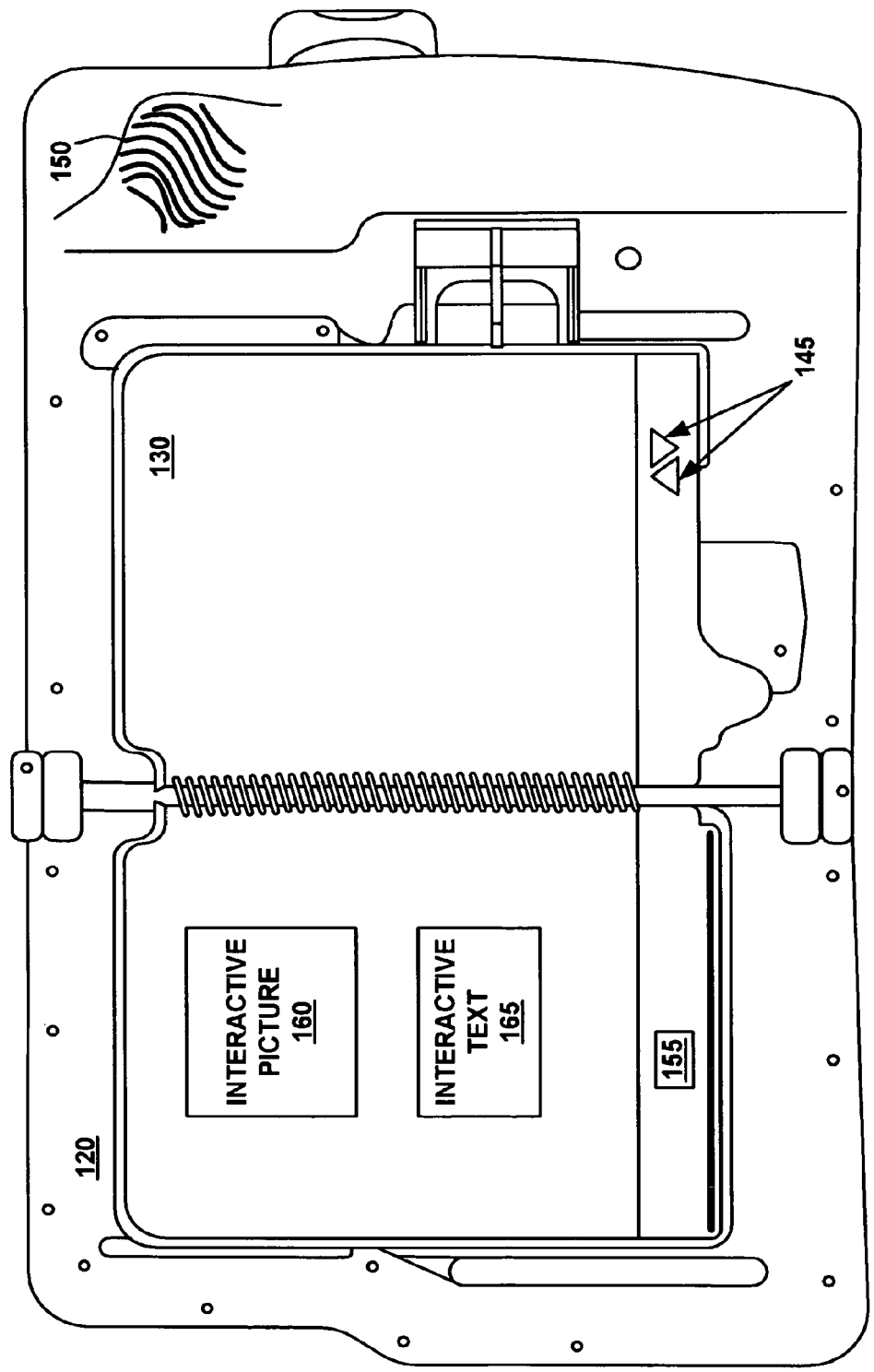
FIG. 1 is an exemplary interactive media-receiving platform and media information detection system, in accordance with an embodiment of the present invention.

In the following detailed description of embodiments of the present invention, interactive media device using capacitive sensing array for joint page identification and page location determination, numerous specific details are set forth in order to provide a thorough understanding of the present invention. However, it will be recognized by one skilled in the art that the present invention may be practiced without these specific details or with equivalents thereof. In other instances, well-known methods, procedures, and components have not been described in detail as not to unnecessarily obscure aspects of the present invention.

Notation and Nomenclature

Some portions of the detailed descriptions that follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "identifying" or "receiving" or "issuing" or "processing" or "detecting" or "determining" or "storing" or "accessing" or "sensing" or "controlling" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Interactive Media Platform

One embodiment the invention comprises an interactive media platform and associated electronics. The platform is able to receive a document (e.g., book, scroll, card, etc.) or other medium for use with an interactive reading and teaching system. The document may contain informational, instructional or entertainment material. The platform is combined with a microprocessor, speaker, stylus, and electronic means for detecting document information. The media information may include the title of the document and the page that is open to the user. However, the media information is not so limited.

FIG. 1 is an exemplary interactive book-based media-receiving platform and media information detection system, in accordance with an embodiment of the present invention. FIG. 1 illustrates a top view of an open book 130 on the surface of an interactive media-receiving platform 120. The open book 130 may have a binding, for example, a spiral spine and fits within a recess in the platform 120. The platform 120 has a sensor network (not depicted in FIG. 1) embedded in the platform 120 under the book pages and that senses markers disposed on or embedded in pages of the book 130. These markers of the book pages thus encode book information based on their location. The markers may be conductive, although this is not a requirement. The sensor network also identifies the location on the page to which a user is referring to by, for example, touching or nearly touching the book.

The book pages may also include symbols 145 for controlling the volume of sound heard through a speaker 150. The user may touch or nearly touch the volume control symbols 145 to turn the volume up or down by selecting a "+" or "−" symbol. Other symbols 155 may be provided on the pages of the book 130 to hear words, spell words, and/or sound out words that are selected on the pages of the open book 130. For example, the user may select a "spell it" symbol and then select the word "leg" or picture of a leg. The user will subsequently hear the sequence of letters l-e-g through the speaker 150.

Other symbols may be provided on the pages of the book 130. For example, the user may select symbols for interactive games and learning activities. For example, after selecting a game symbol, a speech synthesizer in the platform may say "can you find a word with the letter L?" and the user can respond in kind by selecting the appropriate word with. In addition to having interactive symbols printed on the pages of the open book 130, interactive pictures 160 and text 165 may also be printed on the pages. For example, words or pictures may be highlighted to indicate to the user that they are selectable, and that the user will hear or see an audio or visual response to the selection. For instance, the user may select a picture of a fan and the sound of a fan may be produced by the platform. In one embodiment, the sensor network is used to detect user interaction with the symbols. For example, the user may touch or nearly touch a symbol with a finger or other object. The device identifies the location of the symbol based on what portion of the sensor network detects a change in capacitance.

The exemplary platform has a structural design that allows easy placement of a book with a binding on the platform so that the pages of the book lie flat on the surface of the platform. The book and its pages also are easily positioned so that the pages consistently locate over a specific region of the platform, even when placed by a child. As the pages are turned by a user who progressively views and interacts with each page, the pages, after being turned, continue to lie flat either on the surface of the platform or as they stack on either side of the book binding. Furthermore, the book remains in its initial position on the platform in spite of the manipulation that occurs when the book pages are turned.

The platform is additionally configured so that the position of the book and pages is consistently located in proper relationship to the programmed regions for book information (e.g., title and page number). Consistent book positioning may be accomplished by providing a slot to accommodate the binding of the book. The pages of the book lie flat because the book is bound by, for example, a spiral, comb, or other ring type binding that allows the pages fall open and lie flat on a surface. In embodiments of the invention, the pages of the book are positioned consistently because of several design features of the platform and book. Guide tabs guide a page of the book as it is turned and falls into a recessed form of the platform that captures and evenly stacks the pages. Guide tabs are described in U.S. Pat. No. 6,668,156, which is assigned to the assignee of the present application, and is hereby incorporated by reference into the present application for all purposes.

The present invention is not limited to using the exemplary interactive media device of FIG. 1 as a platform for the disclosed sensor network described herein. For example, in one embodiment, the document has a scroll format rather than a book. FIGS. 5A-5C and 14A-14B describe embodiments in which the document is a scroll. In another embodiment, the document is a card. Further, it will be understood that the present invention is not limited to the medium being a document. For example, rather than a book or scroll, an element such as a block (e.g., a child's toy block) may be used with the interactive media device or other device. The document or other medium may be made of a wide range of materials, including but not limited to, paper, plastic and cloth.

Media Information Detection

Embodiments the present invention automatically detect media information, which may include which document out of a number of documents is in the interactive media device, what page(s) of the document is currently facing the user, and what location on the page the user is referring to by, for example, touching the page. Thus, a page of the document may be identified jointly with a user-indicated location on the page. Embodiments of the present invention use a capacitive sensing network for the aforementioned joint identification.

Figure 2A:
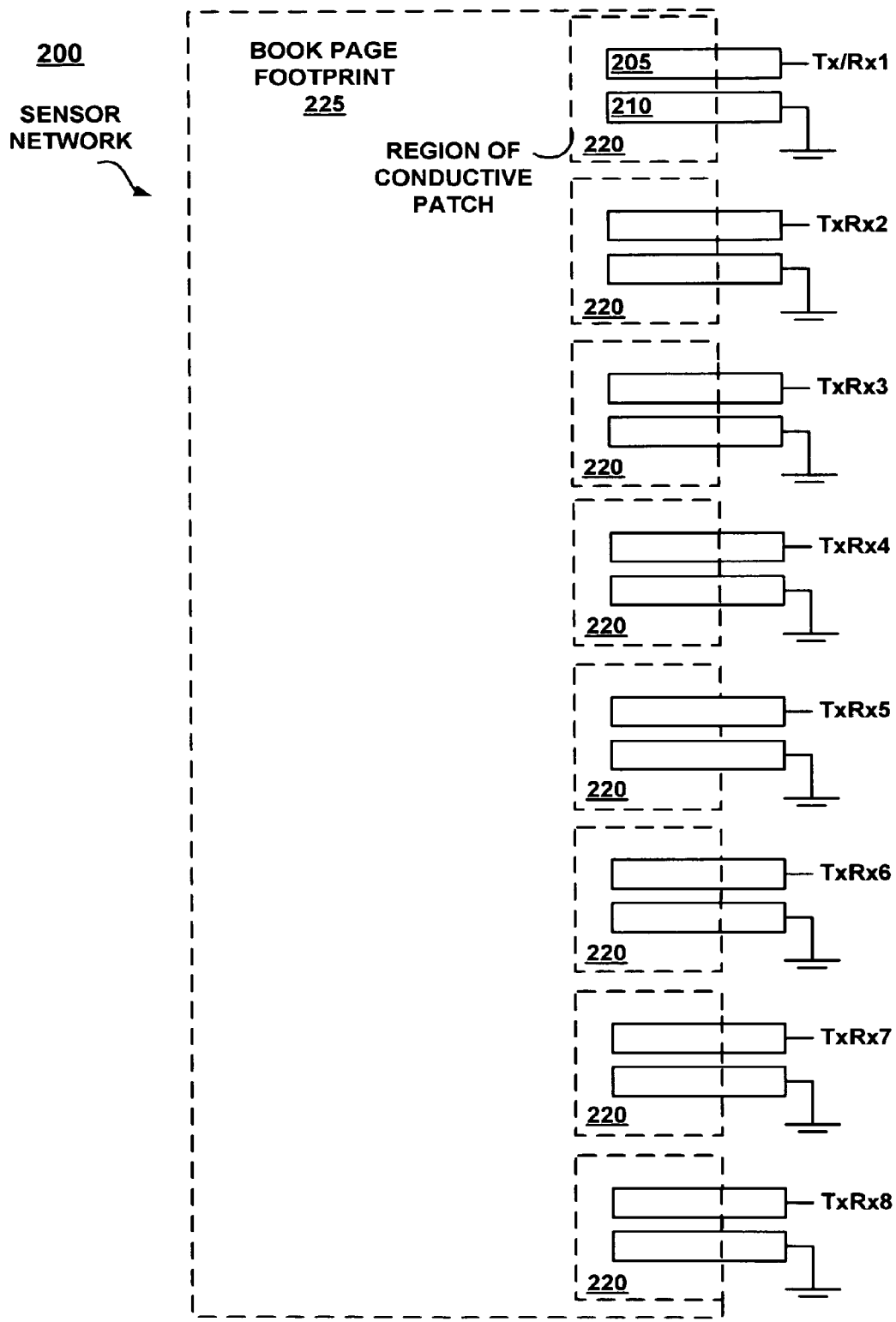
FIG. 2A is an exemplary sensor network able to detect medium information in an interactive media platform, in accordance with an embodiment of the present invention.

FIG. 2A is an exemplary sensor network 200 positioned within the book-receiving slot of device 120 and able to detect media information in an interactive media platform, in accordance with an embodiment of the present invention. Also depicted are positions in which markers 220 on book pages would overlay the sensor network 200. In this embodiment, each conductive marker 220 is located in a pre-determined position within the footprint of book pages 225 to cover one pair of sensor pads. The markers 220 may be on the front or backside of pages and may be semi-transparent. For example, the markers 200 may be printed on the front or backside of the pages. It will be appreciated that some of the ink may penetrate the page in this case. Alternatively, the markers 200 may be embedded within the pages. In this case, a marker may be of a conductive material other than ink. The markers 220 are conductive in this embodiment. However, more generally, the markers may be any material that causes a measurable change in capacitance by, for example, altering a dielectric property in the sensor network 200. The sensor network 200 comprises pairs of sensor pads, in this embodiment; one pad is a transmit/receive pad 205 and the other pad is a ground pad 210. Furthermore, touch pads as described herein for detecting user proximity can be added to the sensor network of FIG. 2A. Therefore, the sensor network may jointly identify the page and a user-indicated location on the page.

Figure 2B:
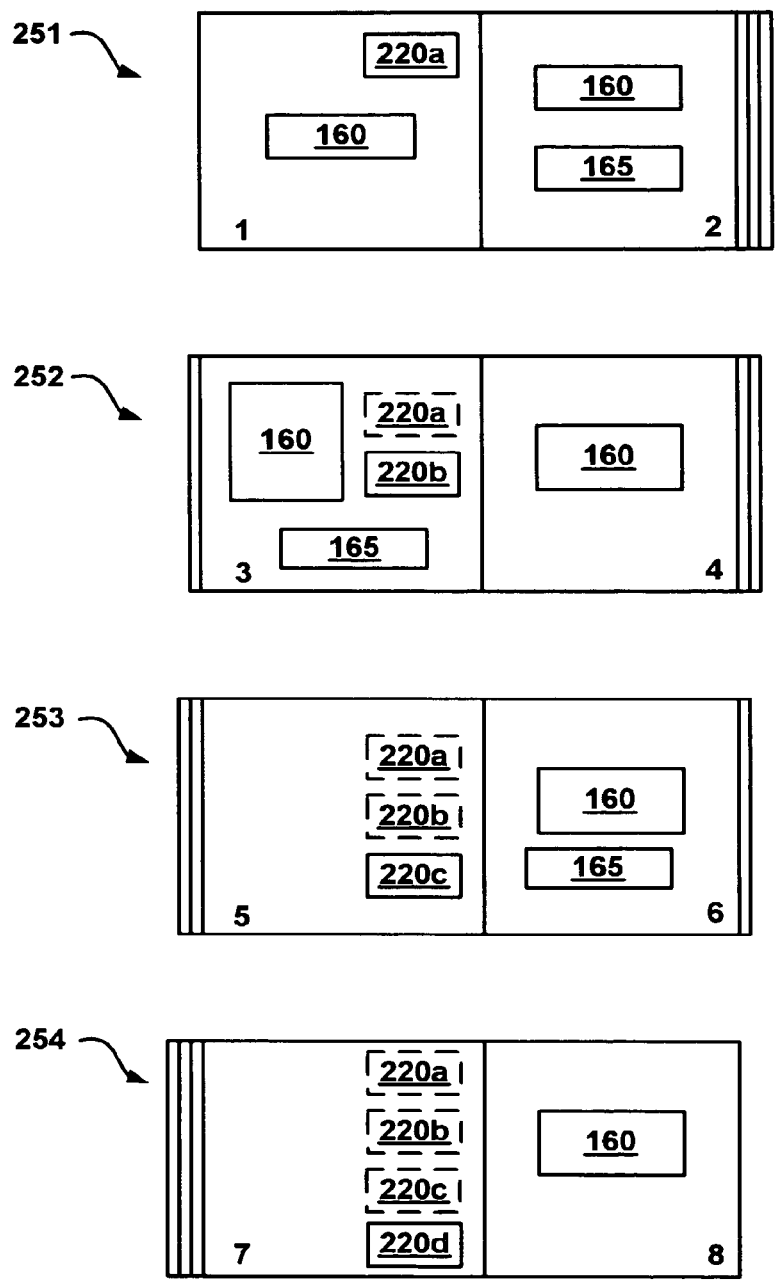
FIG. 2B is an illustration of marker location on various pages of a book that a sensor network in accordance with an embodiment of the present invention is able to detect.

Referring now to FIG. 2B, the page located conductive markers 220a-d typically affect the sensor network 200 when in proximity therewith even though multiple pages are stacked on top of each other overlaying the sensor network 200. In other words, the presence of a marker may be detected through one or more other pages lying between the maker and the sensor. FIG. 2B illustrates four page orientations 251-255 in which different pages are facing the viewer. Herein, these are referred to as facing pages. In orientation 251, the marker 220a is disposed on page one. The marker 220a may be on the facing or back side of page one. When the user turns the page to pages 3-4, the marker 220a for page one is now under the facing page three. The marker 220b for page three will have at least one page between it and the sensor network. When the user has turned to pages 7-8, the page seven marker 220d will have three pages between it and the sensor network. Therefore, the sensor network is able to detect proximity of an individual marker of a facing page through one or more other non-facing pages of the document.

Further, the various markers 220a-d do not overlap each other. Thus, the sensor network 200 is designed to operate with a book with no more than one conductive marker 220 overlaying a respective sensor pad pair, in this embodiment. The book may have a single conductive marker 220 in a different location of each page, in which case the sensor network 200 may be used for page identification. In other words, when a page of an inserted book is open, a pattern of markers 220 unique to the page is exposed (e.g., overlays) the sensors 200. This is true for all pages in the embodiment depicted in FIG. 2B.

However, it will be understood that in other embodiments the book may have more than one conductive marker per page and the sensor network 200 may be use to detect book information other than pages, such as book titles. The conductive markers may be formed of conductive ink; however, ink does not have to be used. In one embodiment, the ink is transparent. The conductive markers may be on the front of back side of the page.

When a conductive marker is in close proximity to a sensor pair, it increases the capacitance to ground from the transmit/receive pad 205. More generally, the markers may be any material that causes a measurable change in capacitance by, for example, altering a dielectric property between ground and the transmit/receive pad 205. The platform is able to detect this change in capacitance, by for example, detecting a change in voltage. For example, in this embodiment, a signal is sent to the transmit/receive pad when a reading is sought. An electrical property such as voltage is read at the transmit/receive pad to determine whether a conductive marker is in close proximity to the sensors.

Figure 4:
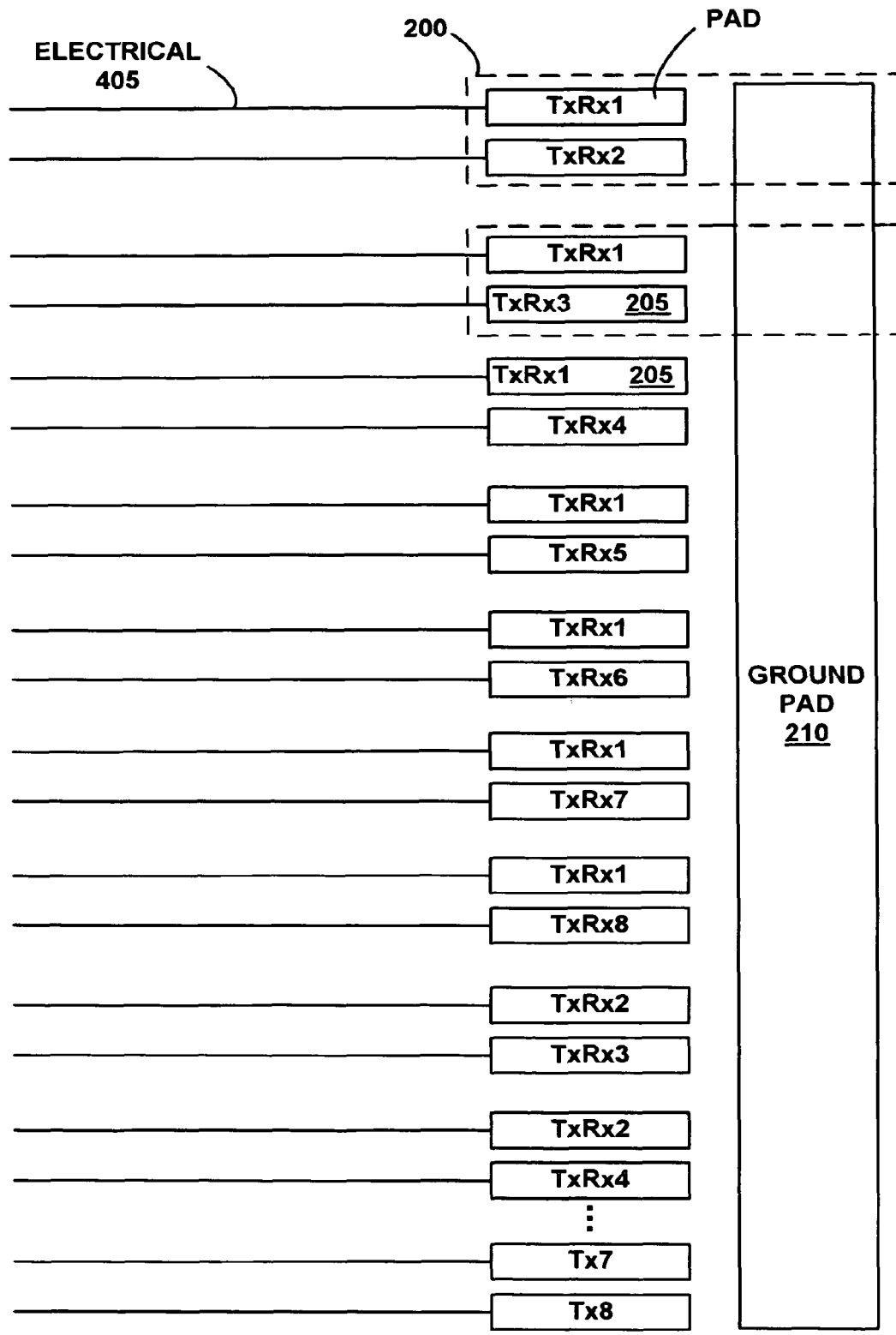
FIG. 4 is an exemplary sensor network having multiple-capacitor sensors, in accordance with an embodiment of the present invention.

In one embodiment, a sensor comprises two pads and forms at least one variable capacitor. The variable capacitor is positioned such that the medium as able to affect the capacitance (e.g., via change in dielectric property) to a degree that is detectable by the platform circuitry. It will be appreciated that modification to the two pads per sensor embodiment of FIG. 2A are possible. In another embodiment, each pair of sensor pads includes a separate transmit pad and a receive pad. Thus, in FIG. 2A the ground pad 210 would be replaced by a receive pad and the transmit/receive pad 205 would be replaced by a transmit pad. In this embodiment, a signal is sent to the transmit pad when a reading is sought. An electrical property such as voltage is read at the separate receive pad to determine whether a conductive marker is in close proximity to the sensor pad pair. It will be appreciated that the ground pad 210 in FIG. 2A may be implemented as a single contiguous pad. FIG. 4 depicts such an embodiment. The device may also comprise a redundant set of pads that reduce false readings from user proximity to the sensor network. For example, it may be possible that user proximity to a pad could change capacitance enough to cause a false reading, which is discarded by examining the readings of redundant sensor network.

Figure 3A:
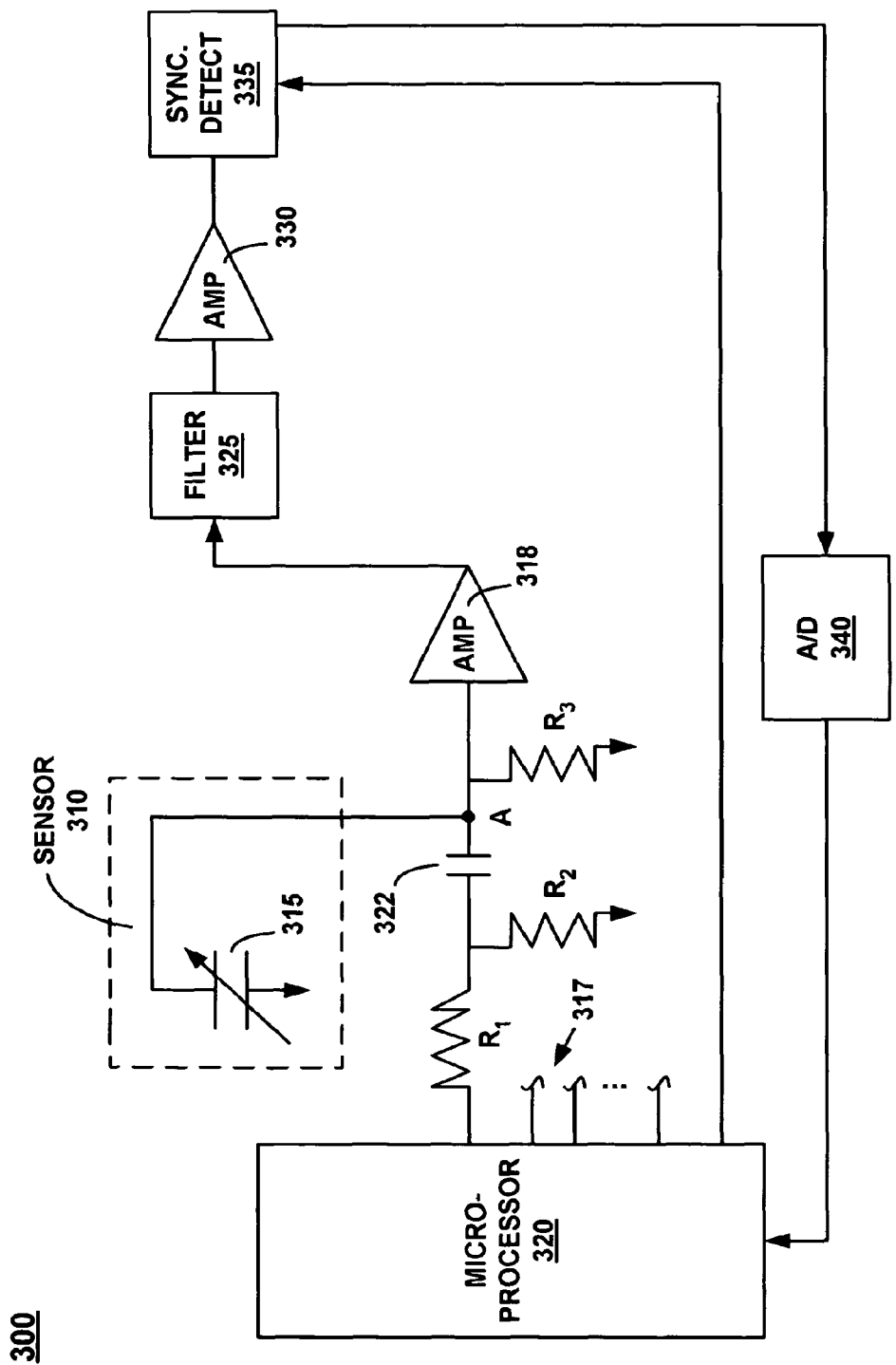
FIG. 3A is a diagram of a circuit able to detect medium information, in accordance with an embodiment of the present invention.

FIG. 3A is a circuit diagram illustrating principles of operation of embodiments of the present invention. The circuit 300 includes a sensor 310 modeled as a variable capacitor 315. In practice, the sensor 310 may comprise a transmit/receive pad (not depicted in FIG. 3) and a corresponding ground pad (not depicted in FIG. 3), with each sensor pad serving as one plate of the variable capacitor 315. When a conductive portion of a book page (or other conductive element) is in close proximity with the sensor 310, the capacitance of the variable capacitor 315 increases. Thus, the sensor pads are positioned such that the book is allowed to affect the dielectric of the variable capacitor 315. In one embodiment, the sensor network is used to detect user interaction with symbols or the like. For example, if a user touches or nearly touches a single pad, a variable capacitor is formed between the pad and ground, with the user's body forming the dielectric. Thus, the variable capacitor 315 comprises a single pad in a user touch embodiment.

The variable capacitor 315 in FIG. 3A forms a voltage divider with capacitor 322, wherein the voltage at node "A" is a function of the capacitance of the variable capacitor 315. Node "A" is coupled to the input of a high impedance amplifier 318 (e.g., JFET). The circuit 310 detects the change in capacitance by a change in voltage at the input of the amplifier 318. For example, the voltage at node "A" goes down in response to the variable capacitance going up. To detect the change in capacitance, the microprocessor 320 sends out a transmit signal to the sensor 310. The amplifier 318 detects the voltage at node "A," which is filtered and amplified, by filter 330 and amplifier 330. A synchronization detect 335 is controlled by a signal based on the transmit signal, wherein the analog-to-digital converter 340 receives a signal at the proper time. The ND signal is input to the microprocessor 320. Thus, the microprocessor 320 is able to detect when a conductive element is placed in proximity to the sensor 310 by the change in the value from the A/D.

Only one sensor 310 and associated circuitry is depicted in FIG. 3A, although typically the sensor network will comprise many sensors 310. The circuit 300 has additional circuitry 317 for implementing the additional sensors 310. The additional circuitry 317 may include elements similar to the depicted resistors R1-R3 and capacitors 315 and 322, as well as amplifier 318. The additional circuitry 317 may also include additional elements. It will be appreciated that some of the circuitry depicted in FIG. 3A may be used in connection with multiple sensors 310.

It will be appreciated that the circuit 300 in FIG. 3A is exemplary. The circuit 300 may be used to implement the embodiment depicted in FIG. 2A; however, the embodiment of FIG. 2A is not so limited. Moreover, it will be appreciated that the present invention is not limited to the circuit 300 of FIG. 3A. For example, it is not required that any of the pads forming the sensor are electrically coupled directly to ground. Thus, the variable capacitor 315 does not have to be connected to ground. Portions of the sensor circuit may be implemented with an electric field imaging device, such as the MC33794 provided by Freescale Semiconductor Inc. of Austin, Tex. An electric field imaging device typically has outputs for driving a number of sensing electrodes. A combined transmit/receive pad, a transmit pad, or a receive pad may be implemented by coupling a conductive element to the end of one of the electrodes.

Figure 3B:
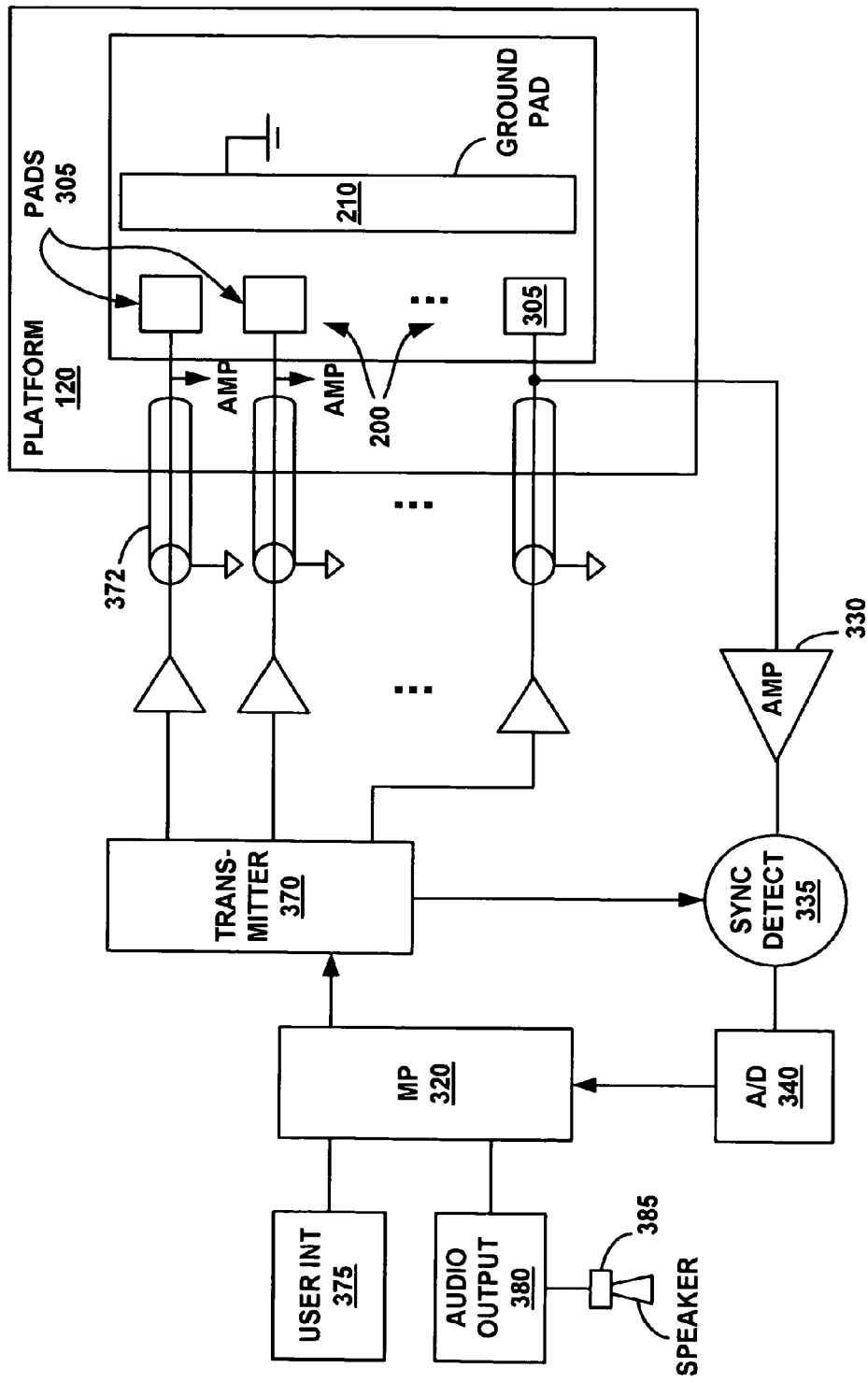
FIG. 3B is a block diagram of a circuit able to detect medium information, in accordance with an embodiment of the present invention.

FIG. 3B is a block diagram of a circuit able to detect medium information, in accordance with an embodiment of the present invention. The processor 310 sends commands to the transmitter 370, to cause a sequence of transmit signals to the pads 305 via electrodes 372. The processor 320 receives signals from the ND 340 that indicate capacitive changes in the sensor network 200 in the platform 120. The processor 320 is coupled to audio output 380, which drives the speaker 385. In one embodiment, the processor 320 controls the audio output based on the page and book that was detected. The processor 320 is also coupled to user interface 375. While grounded shields are used in the embodiment of FIG. 3B, active driven shields may be used to reduce the capacitance to ground in the electrodes.

FIG. 4 is an exemplary sensor network 400 employing two transmit/receive pads 205 per sensor, in accordance with an embodiment of the present invention. For example, each book conductive region 220 overlays a pair of transmit/receive pads 205 and the ground pad 210. Thus, each sensor comprises two variable capacitors.

In this embodiment, the sensor network 400 is configured such that transmit/receive pads 205 are paired together to allow more information to be identified without increasing the number of electrodes. For example, there are eight transmit/receive electrodes 405 in FIG. 4. However, a given electrode 405 (e.g., TxRx1) is coupled to numerous pads 205. This may allow, for example, not only the page to be uniquely identified, but also information such as the title of the book. Therefore, the platform can automatically identify the book so that a user (e.g., child) does not have to manually perform this function.

It will be appreciated that the configuration of FIG. 4 is exemplary of a way to pair transmit/receive pads and the other configurations are within the scope of this embodiment. In additional embodiments, each sensor comprises three or more variable capacitors to allow for even greater amount of information to be identified without increasing the number of electrodes. For example, a sensor may comprise a TxRx1 pad, TxRx2 pad, TxRx3 pad, and a shared (or separate) ground pad. Furthermore, touch pads as described herein for detecting user proximity can be added to the sensor network of FIG. 4. Therefore, the sensor network may jointly identify the page and a user-indicated location on the page.

Figure 5A:
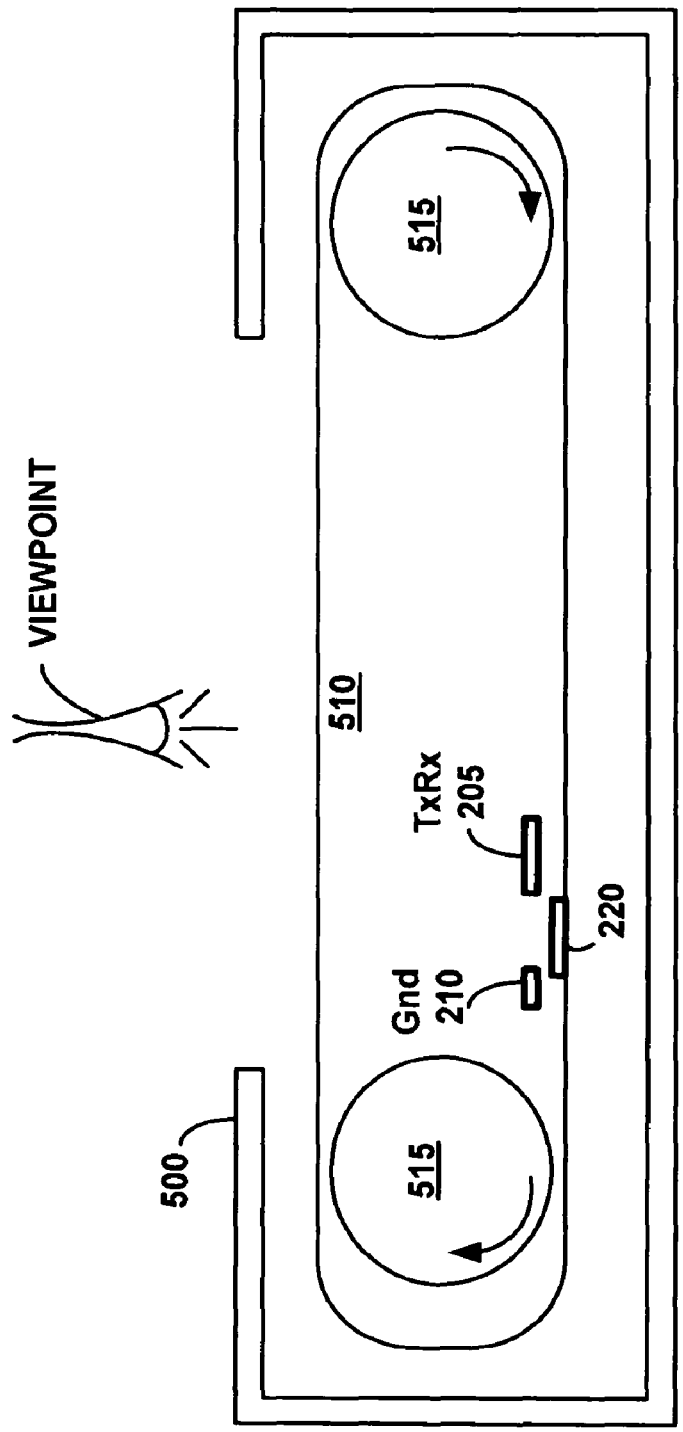
FIG. 5A is a side perspective view of an exemplary platform having a scroll form factor with sensors to detect media information, in accordance with an embodiment of the present invention.

FIG. 5A is a side perspective view of an exemplary platform 500 having a scroll form factor with sensors to detect media information, in accordance with an embodiment of the present invention. The scroll form factor allows a scroll 510 to be placed on the rollers 515. The scroll may be divided into sections referred to as pages or sheets. For example, FIG. 5C depicts a scroll 510 divided into several pages 575. The scroll 510 has conductive markers 220 that are detected by the sensor network, thus allowing identification of the scroll and "page" number facing the viewer. In this case, the sensors comprise a TxRx pad 205 and a ground pad 210. However, other sensor configurations may be used, such as, a transmit pad and a receive pad, or multi-pad configurations such as depicted in FIG. 4. In one embodiment, the rollers 515 are under control of a microprocessor, which uses information detected by the sensor network to control scroll motion.

Figure 5B:
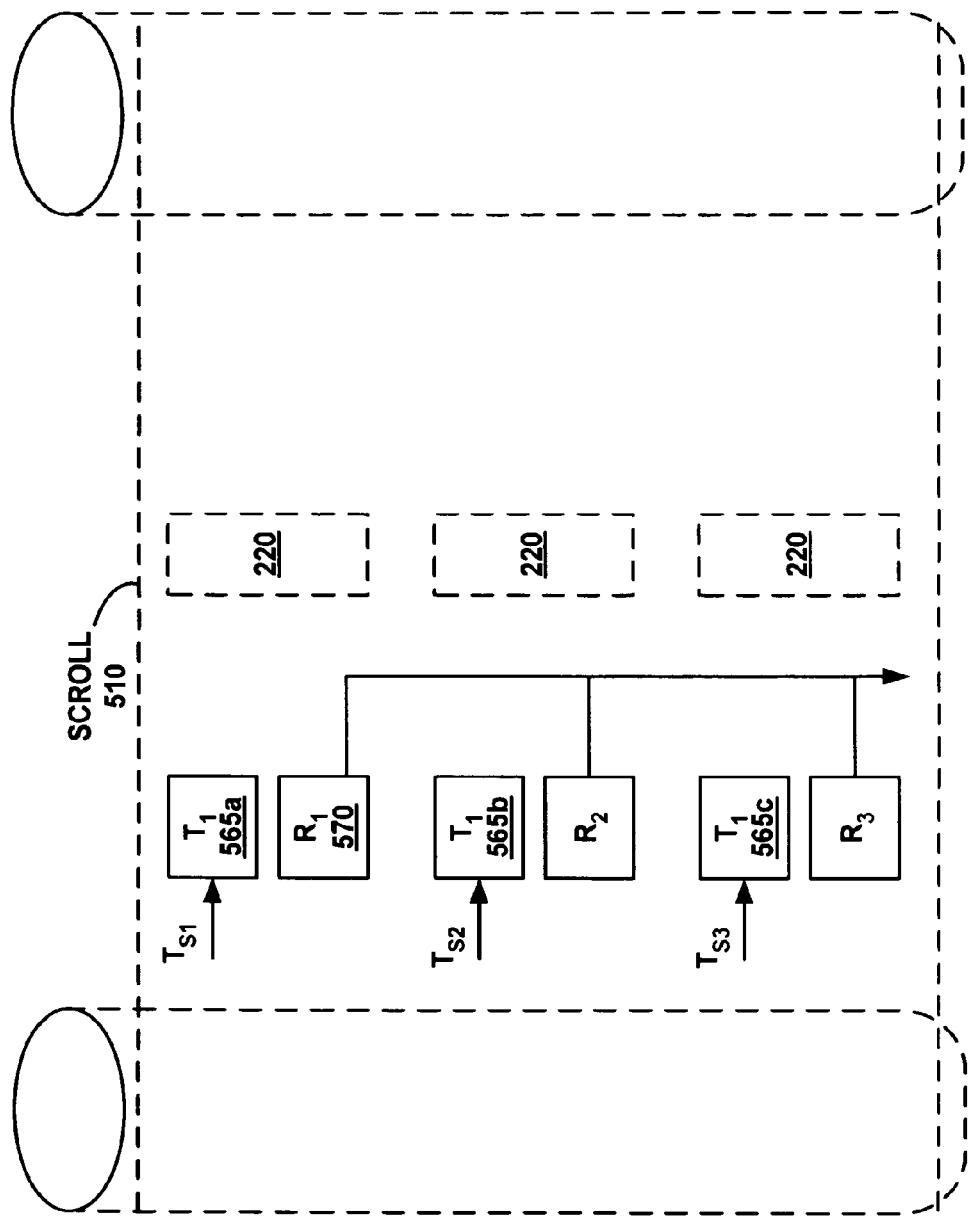
FIG. 5B is a top perspective view of the exemplary sensor network of FIG. 5A, in accordance with an embodiment of the present invention.
Figure 5C:
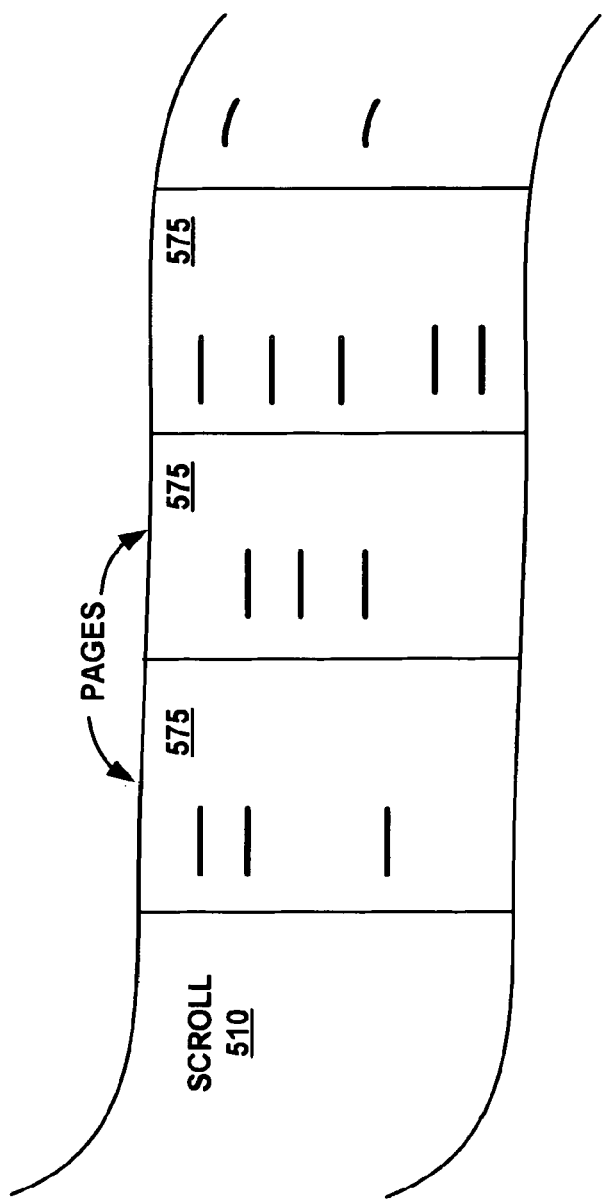
FIG. 5C is an illustration of a scroll having markers and a sensor network that detects the markers in accordance with the present invention detects.

FIG. 5B is an exemplary sensor network 550 able to detect media information in an interactive media platform having a scroll form factor, in accordance with an embodiment of the present invention. FIG. 5B is a view of FIG. 5A from "viewpoint." In FIG. 5B, a sensor comprises a transmit pad 565 and a receive pad 570. However, a sensor can also be formed of a transmit/receive pad and a ground pad similar to FIG. 1. Further, a multi-pad sensor similar to FIG. 4 may be employed. FIG. 5B illustrates three sensors; however, many more sensors may be used. The scroll 510 illustrates the locations for three potential conductive markers 220.

In the embodiment of FIG. 5B, the transmit signals Ts1-Ts3 are time multiplexed, such that at any time only one of the transmit one pads 565a-565c will have an active signal. This allows the receive pads 570 to be electrically coupled and spatially multiplexed such that several receive pads 570 can share the same circuitry that detects capacitive changes in response to a conductive marker 220 being near a sensor.

In one embodiment, the coding on the scroll 510 is sequential. For example, there are additional columns of conductive markers 220 on the scroll 510. This allows far more code options than with a single column of conductive markers 220. Moreover, because the conductive markers 220 in a given column of the scroll 510 are not overlapped by another column, the embodiment of FIGS. 5A-5C allows $2^n$ bits of information to be encoded. For example, unlike a book embodiment of FIG. 1, pages on a scroll do not overlap (see e.g., FIG. 5C). This allows efficient encoding of both the page and a scroll identifier. For example, Table 1 depicts an implementation in which five bits are used to identify what scroll is in the interactive media device and three bits are used to encode the page currently viewable.

TABLE 1

| BIT | 0 | 1 | 2 | 3 | 4 | 5 | 6 | 7 |
|---|---|---|---|---|---|---|---|---|
| | Scroll Identifier | | | | | Page Identifier | | |

Another aspect of a scroll embodiment is that the signal strength increases substantially as the conductive markers 220 overlay the sensor network 550. This allows control of scroll motion based on the alignment of the conductive markers to the sensor network.

Figure 6A:
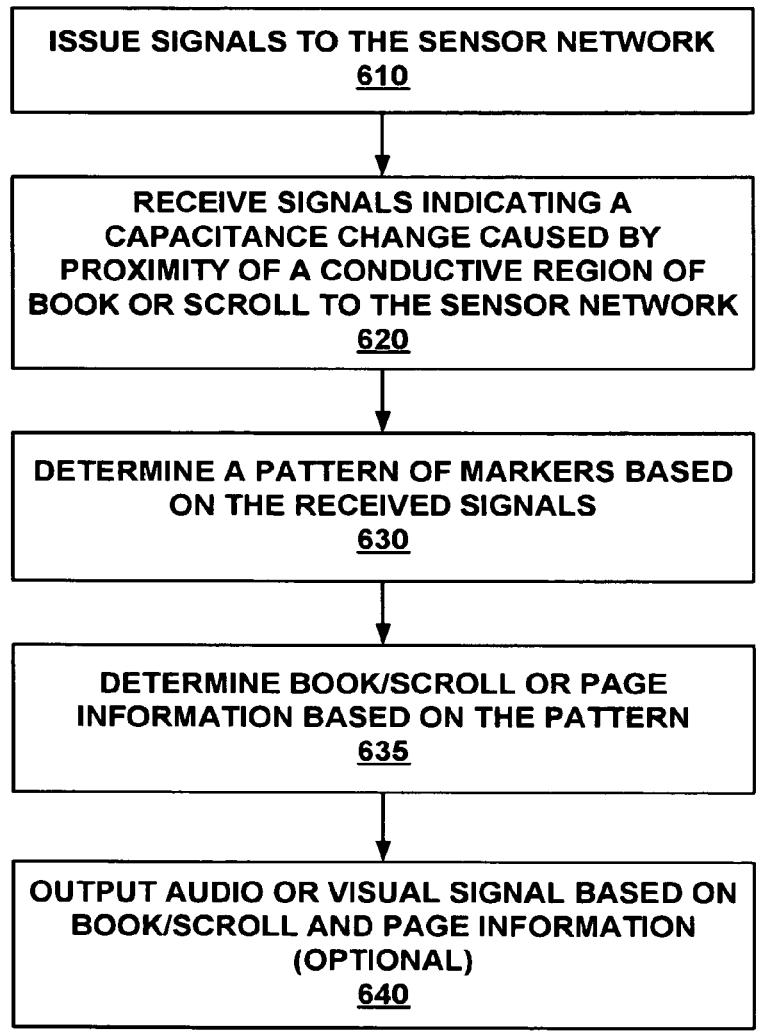
FIG. 6A is a flowchart illustrating steps of a process of detecting book and page information, in accordance with an embodiment of the present invention.

FIG. 6A is a flowchart illustrating steps of a computer-implemented process 600 of detecting medium information in an interactive media platform, in accordance with an embodiment of the present invention. Step 610 is issuing signals to the sensor network.

Step 620 is receiving signals indicating a capacitance change caused by proximity of a marker of the document to the sensor network. The marker may be a conductive region. The document may be a book, scroll, or even a toy such as a child's toy block. The signal may be a voltage reading, wherein the voltage changes in response to a capacitance change.

Step 630 is determining a pattern of the markers based on the received signals. Step 635 is determining information relating to the medium based on a relationship between the sensor configuration and the capacitance change. The information may include the title of the book or scroll and what page(s) of the book/scroll are currently overlaying the sensor network. The information might also include identification of a particular toy, such as a child's block.

Optional step 640 is outputting audio or visual information based on the book/scroll and page information. Step 640 may also be based on user input, such as user identification of a symbol on the page. The process 600 then ends.

Figure 6B:
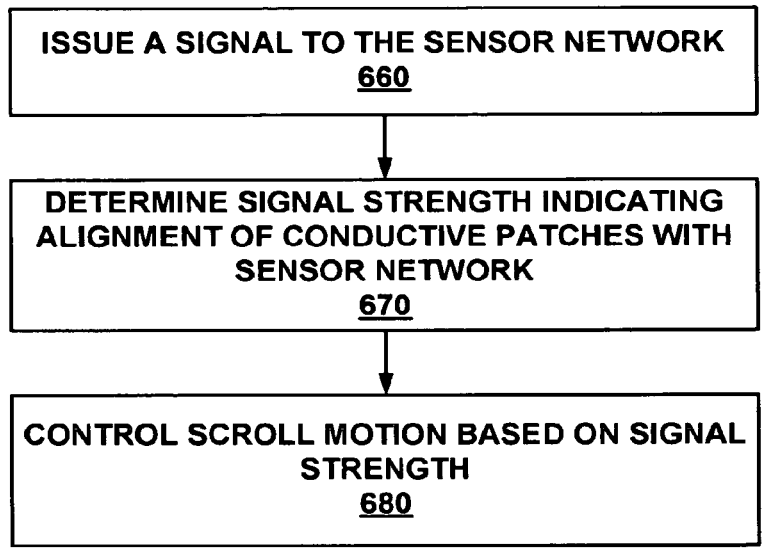
FIG. 6B is a flowchart illustrating steps of a process of controlling scroll motion, in accordance with an embodiment of the present invention.

FIG. 6B is a flowchart illustrating steps of a computer-implemented process 650 of controlling a scroll in an interactive media platform, in accordance with an embodiment of the present invention. Step 660 is issuing a signal to the sensor network. The signal is one of a number of signals transmitted to various pads in the sensor network. Step 670 is determining signal strength indicating alignment of conductive markers on the scroll with a sensor network. Step 680 is controlling the scroll based on the signal strength. For example, a page of the scroll can be aligned in the platform based on the alignment of the book markers to the sensor network.

While embodiments have described the book or scroll markers as being conductive, it will be appreciated that the markers do not have to be conductive. More generally, the markers may be any material that causes a measurable change in capacitance by, for example, altering a dielectric property in the sensor network.

Exemplary Computer Platform

Figure 7:
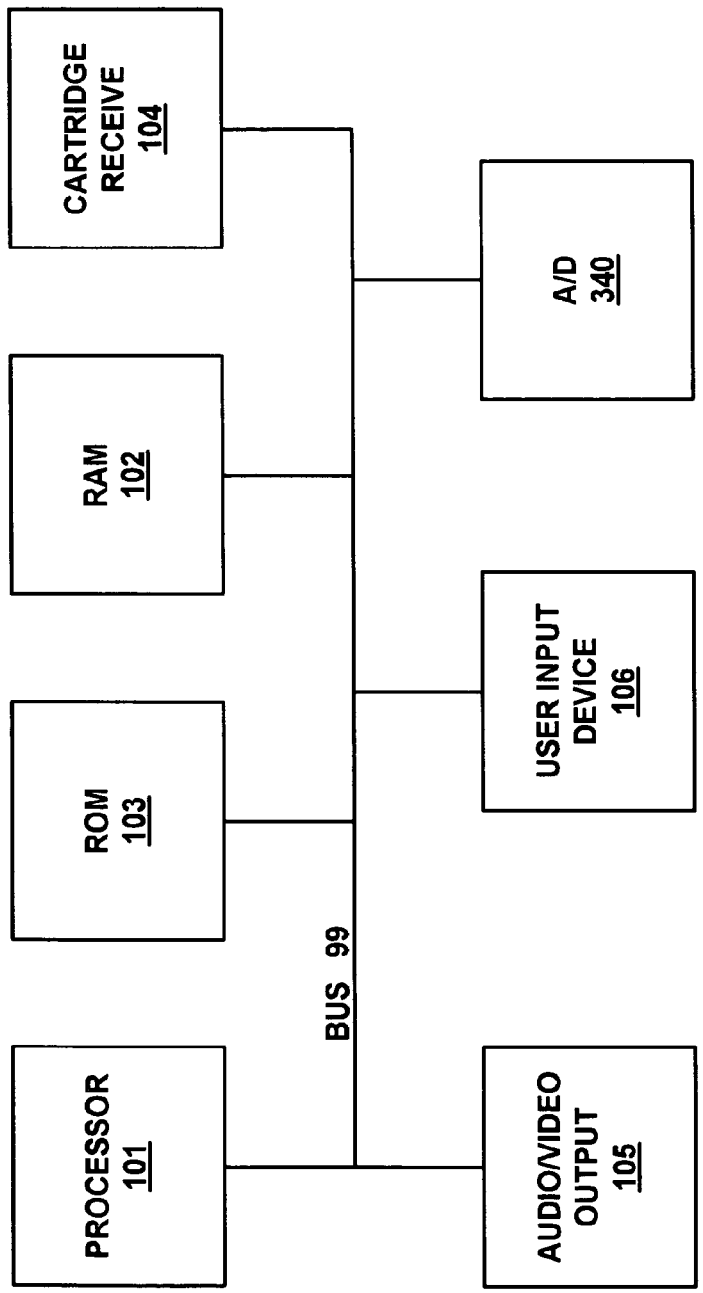
FIG. 7 is an exemplary computer system that may serve as a platform upon which embodiments of the present invention may be executed.

FIG. 7 illustrates circuitry of an exemplary computer system 100, which may form a platform for embodiments of a method and device for capacitive sensing array for joint page identification and page location determination. Computer system 100 includes an address/data bus 99 for communicating information, a central processor 101 coupled with the bus for processing information and instructions, a volatile memory 102 (e.g., random access memory RAM) coupled with the bus 99 for storing information and instructions for the central processor 101 and a non-volatile memory 103 (e.g., read only memory ROM) coupled with the bus 99 for storing static information and instructions for the processor 101.

The cartridge receive unit 104 may be used for cartridges that enhance the interactive media experience. For example, a cartridge may contain instructions that when executed by the processor 101 enhances the user experience with a book or scroll in an interactive media device. The audio/video output 105 allows interactive media experiences based on the book or scroll and its current page. The user input device 106 may include a stylus, which allows identification of a symbol on a page. The ND 340 allows various signals such as a voltage change indicative of a capacitive change to be interpreted by the processor 101.

Joint Page Identification and Page Location Determination

Figure 8:
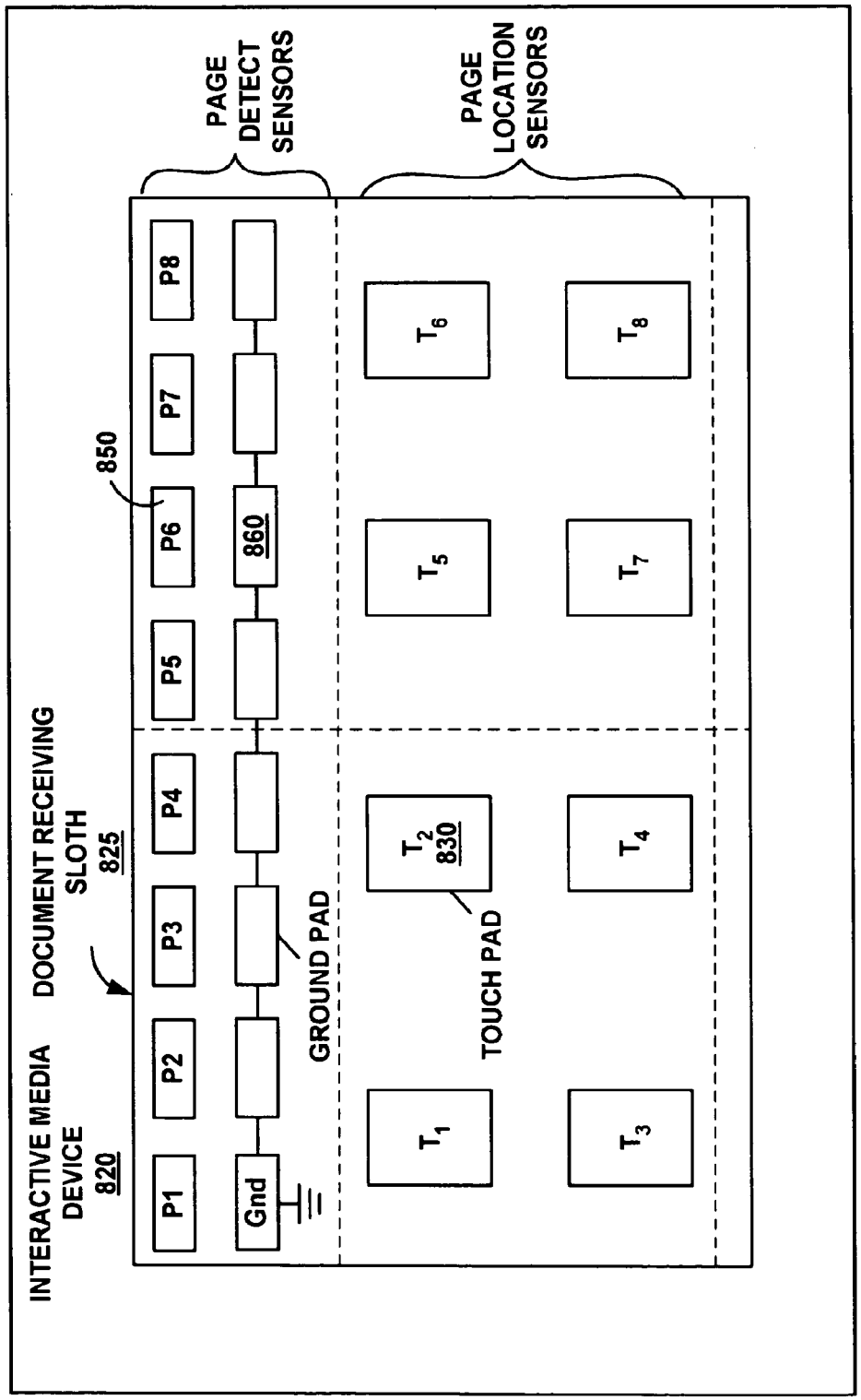
FIG. 8 is an exemplary capacitive sensor array having sensors for touch points and page marker sensors, in accordance with an embodiment of the present invention.

FIG. 8 is an exemplary capacitive sensor network having sensor pads for page location detection, e.g., user touch points, and sensor pads for page detection, e.g., page marker areas, in accordance with an embodiment of the present invention. The exemplary sensor network is positioned within the document receiving slot 825 of device 820. Thus, the document (not depicted in FIG. 8) overlays the sensor network. The sensor network has a first region that includes sensor pads P1-P8 (850) or corresponding ground pads 860 for detecting markers disposed on or embedded in the document. A sensor comprises one of the pads P1-P8 (850) and its adjacent ground pad 860. A marker may be disposed on or embedded in the document such that it overlays one of the pad pairs.

The sensor pads T1-T8 (830) in the second region are for identifying the location in the document to which the user is indicating, e.g., touching, nearly touching, or otherwise indicating. For example, the interactive media device 820 identifies which pad T1-T8 a user touches or nearly touches based on a change in capacitance caused by the touch or near touch.

Figures 9A, 9B:
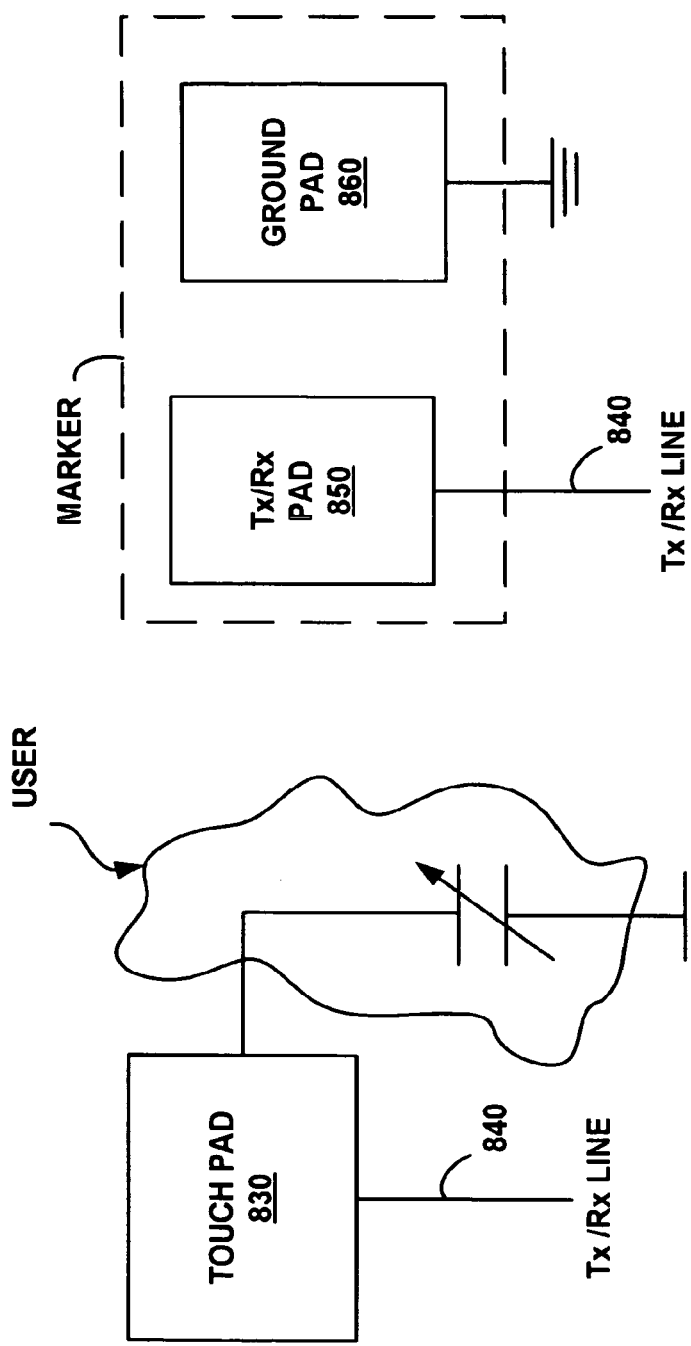
FIG. 9A is an exemplary touch pad and transmit/receive line illustrating principles in accordance with an embodiment of the present invention.
FIG. 9B is an exemplary page marker sensor and transmit/receive line illustrating principles in accordance with an embodiment of the present invention.

Referring to FIG. 9A, when a user touches or nearly touches the document proximate a touch pad 830, a capacitor is formed between the touch pad 830 and ground with the user providing the path to ground. The dielectric is made up of the user, as well the part of the document between the user and the touch pad. The capacitor thus formed is referred to herein as a variable capacitor because of the difference in capacitance with user touching and the user not touching the touch pad. A transmit/receive line (Tx/Rx) 840 is electrically coupled to the touch pad 830 to allow detection of the capacitance change.

Referring to FIG. 9B, when a marker disposed on or in a document touches or nearly touches Tx/Rx pad 850, a capacitor is formed between the touch pad 850 and the ground pad 860. The dielectric is made up of the marker and part of the document, such as paper between the marker and the pads. The capacitor thus formed is referred to herein as a variable capacitor because of the difference in capacitance when comparing the marker in close proximity to the pads versus not in close proximity the user. A transmit/receive line (Tx/Rx) 840 is electrically coupled to the touch pad to allow detection of the capacitance change.

It is possible to use a single application specific integrated circuit (ASIC) for circuitry coupled to the Tx/Rx lines 840 of both the touch pads 830 for page location and the Tx/Rx pads 850 for marker detection. In the embodiment depicted in FIG. 8, there are eight page marker sensors and eight touch point sensors. A single ASIC may be used for all of the 16 separate Tx/Rx lines coupled to the marker and touch point pads.

Figure 10A:
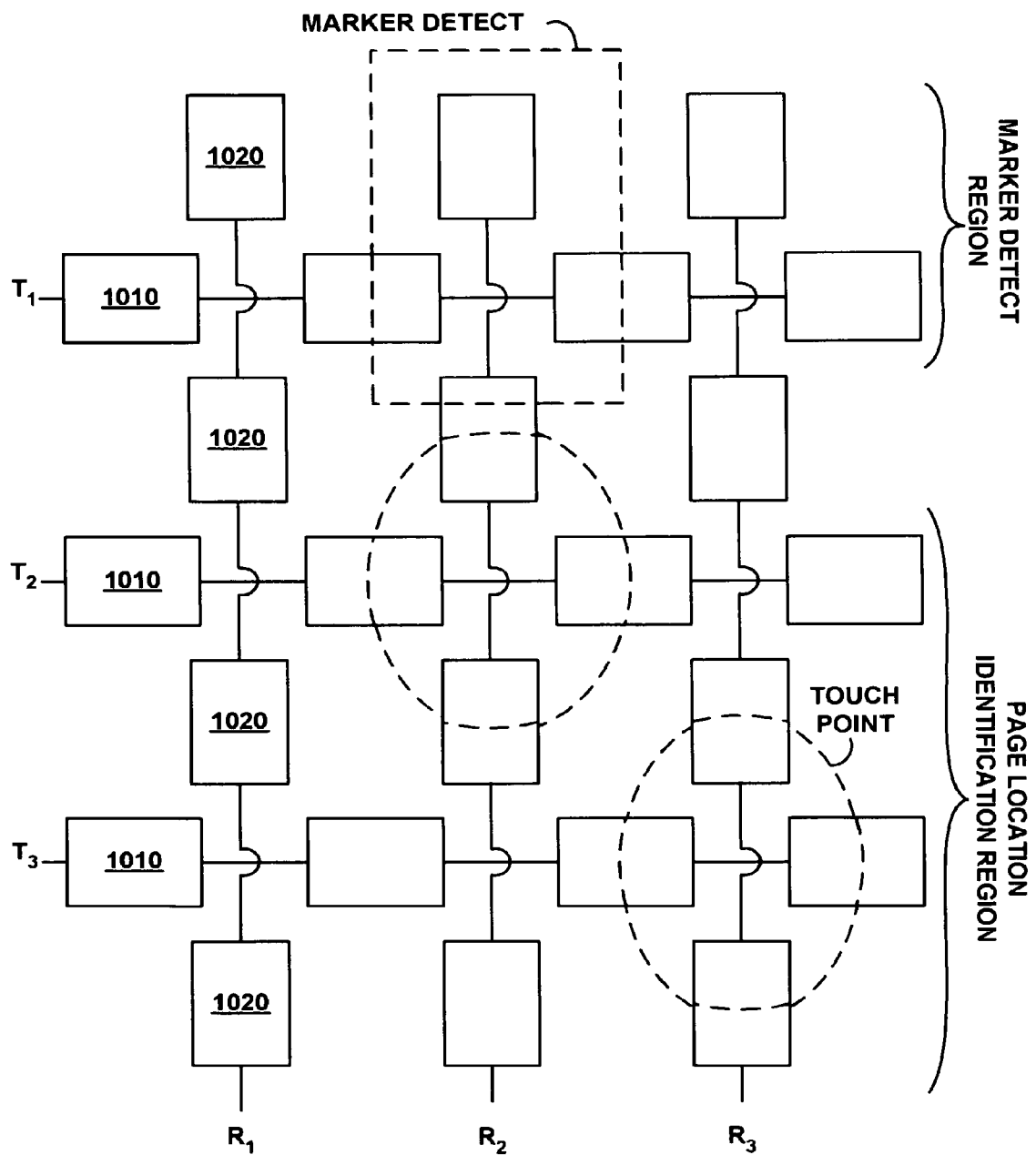
FIG. 10A is an exemplary capacitive sensor array having sensors for touch points and for page markers, in accordance with an embodiment of the present invention.

FIG. 10A is an exemplary capacitive sensor array 1000, in accordance with an embodiment of the present invention. The sensor array 1000 comprises an array of transmit lines (T1-T3) and receive lines (R1-R3). Each line has sensor pads (1010, 1020) to provide a sufficient surface such that a user or page marker in close proximity to a transmit line/receive line junction will be detectable. Thus, the region around each junction is a sensor point that can be used to detect either user touch or document markers.

The marker detect region comprises transmit line T1 (and its sensor pads 1010) and adjacent receive pads 1020. A marker detect region at the junction of lines T1 and R2 is depicted. The page marker should overlay at least one transmit pad 1010 on line T1 and at least one adjacent receive pad 1020 on one of the receive lines for sufficient detection. In a typical implementation, page identification is achieved by transmitting a signal on line T1 and receiving separate signals on lines R1-R3. Typically, the voltage of the signal on a receive line is a function of the capacitance between the receive line and the transmit line currently transmitting a signal. Therefore, the voltage magnitude on the receive line(s) may be used to detect page marker proximity to the transmit line/receive line junction.

The page location identification region comprises transmit lines T1 and T2 (and associated transmit pads 1010), as well as receive pads 1020 on all three lines R1-R3 that are adjacent to lines T2 and T2. Exemplary touch points are depicted at the junction of lines T2/R2 and T3/R3. In a typical implementation, page location is achieved by transmitting a signal on line T2 and receiving separate signals on lines R1-R3. Typically, the voltage of the signal on a receive line is a function of the capacitance between the receive line and the transmit line currently transmitting a signal. Therefore, the voltage magnitude on the receive line(s) may be used to detect user proximity to the transmit line/receive line junction. The process is repeated for line T3.

The embodiment of FIG. 10A allows for a separate sensor at each transmit line/receive line junction. Therefore, if the sensor array includes eight transmit and eight receive lines, then 64 sensor points are possible. If one transmit line is dedicated to marker detect points then eight marker detect points and 56 touch points are possible. Thus, a single ASIC capable of supporting a combination of 16 transmit and receive lines may thus support eight marker detect points and 56 touch points in this embodiment.

Figure 10B:
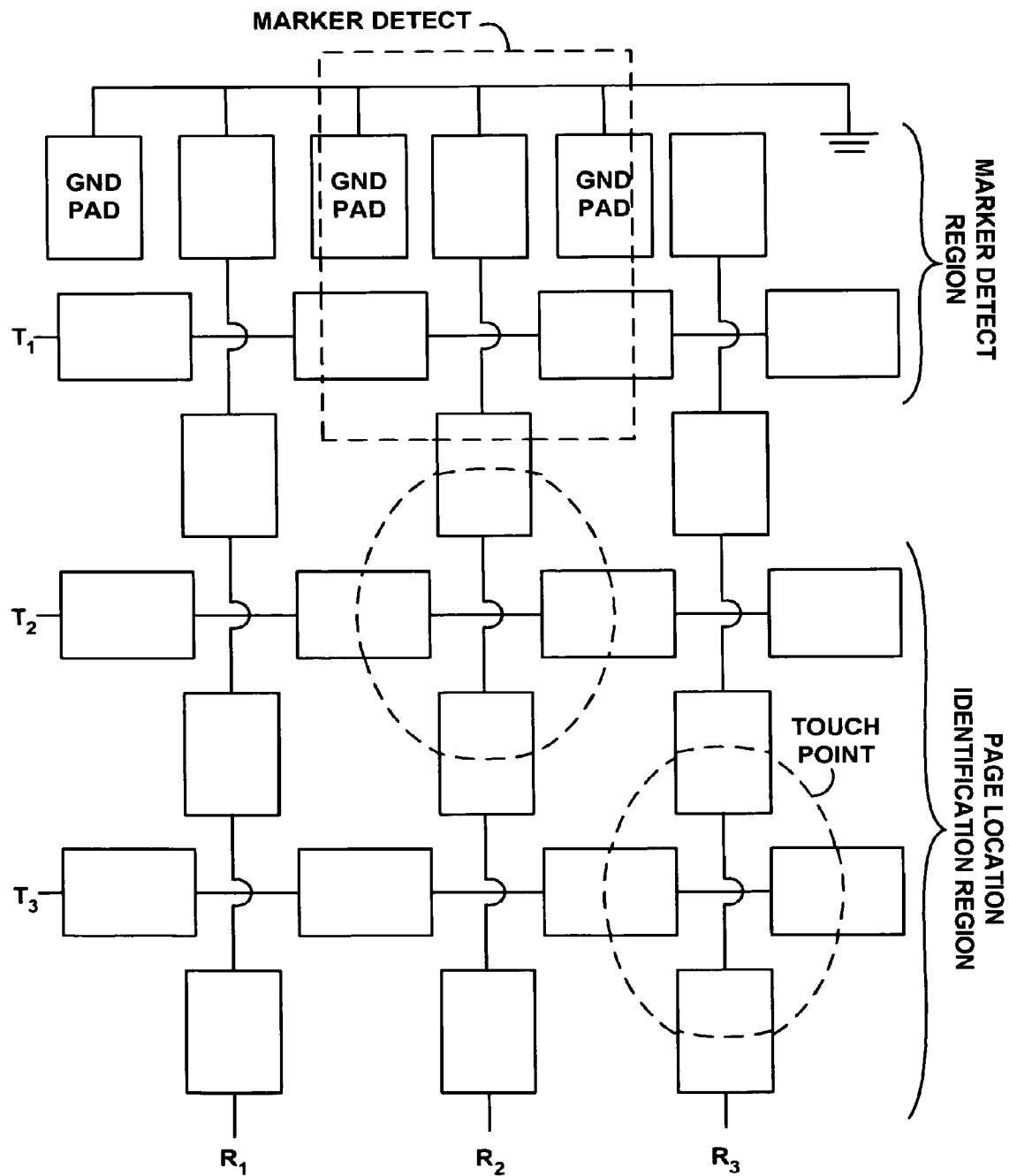
FIG. 10B is an exemplary capacitive sensor array having additional ground pads, in accordance with an embodiment of the present invention.

FIG. 10B is an exemplary capacitive sensor array similar to the sensor array of FIG. 10A, but having additional sensor pads coupled to ground, in accordance with an embodiment of the present invention. Such a design provides a path to ground for the signal on the transmit lines, if the page marker is positioned between the transmit line and a ground pad. Thus, this embodiment allows for improved marker detection. If desired, additional ground pads could also be placed in the page location identification region.

Figure 11:
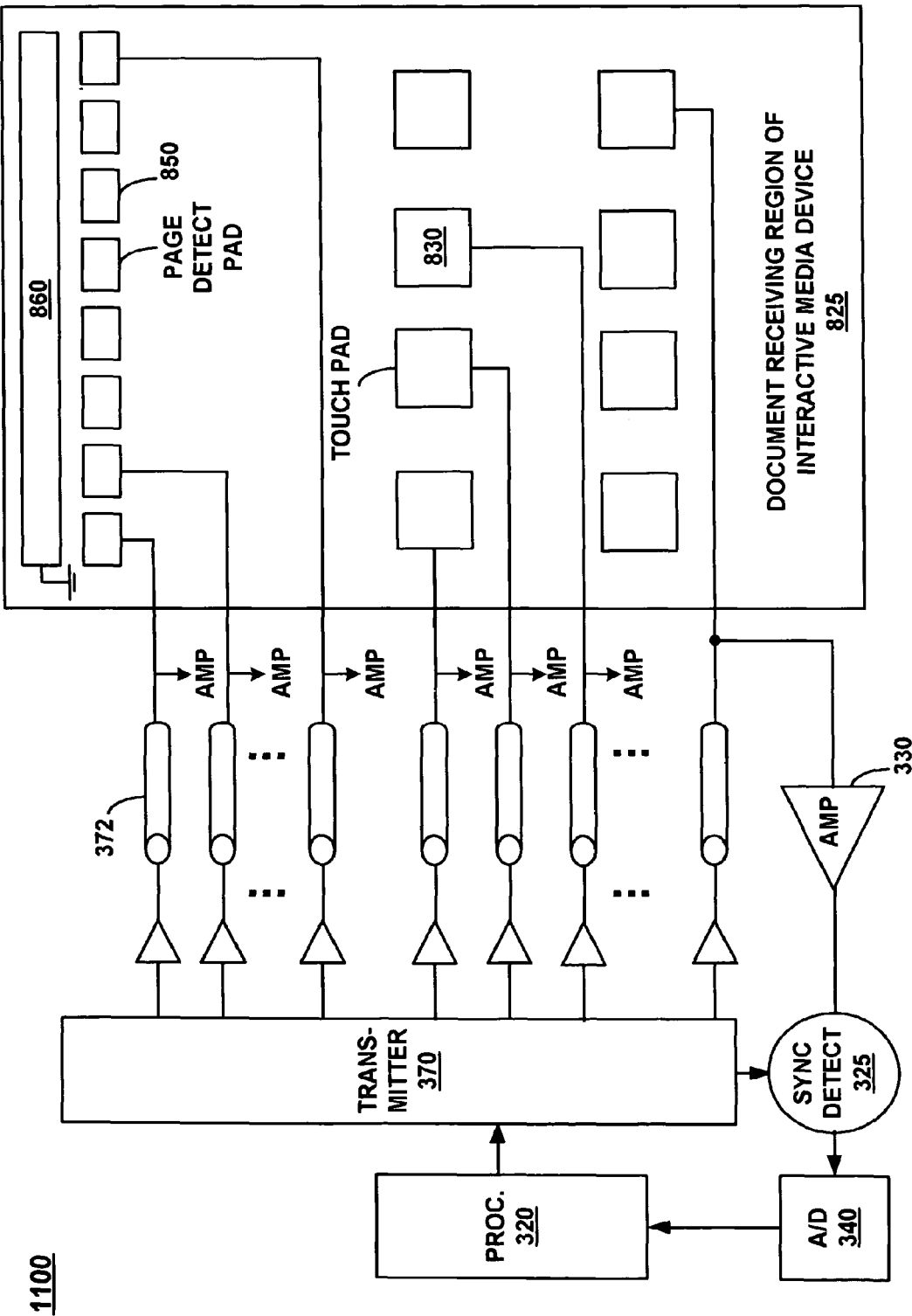
FIG. 11 is a block diagram of a circuit for identifying pages and page location, in accordance with an embodiment of the present invention.

FIG. 11 is a block diagram of a circuit 1100 for automatically identifying pages and user-indicated page location, in accordance with an embodiment of the present invention. The processor 310 sends commands to the transmitter 370, to cause a sequence of transmit signals to the page detect pads 850 and the touch pads 830 via electrodes 372. The processor 320 receives signals from the A/D 340 that indicate capacitive changes in the sensor network underlying the document receiving region 825 of the interactive media device. In one embodiment, the processor 320 controls audio output based on the page and book that was detected. While grounded shields are used in the embodiment of FIG. 11, active driven shields may be used to reduce the capacitance to ground in the electrodes.

Figure 12:
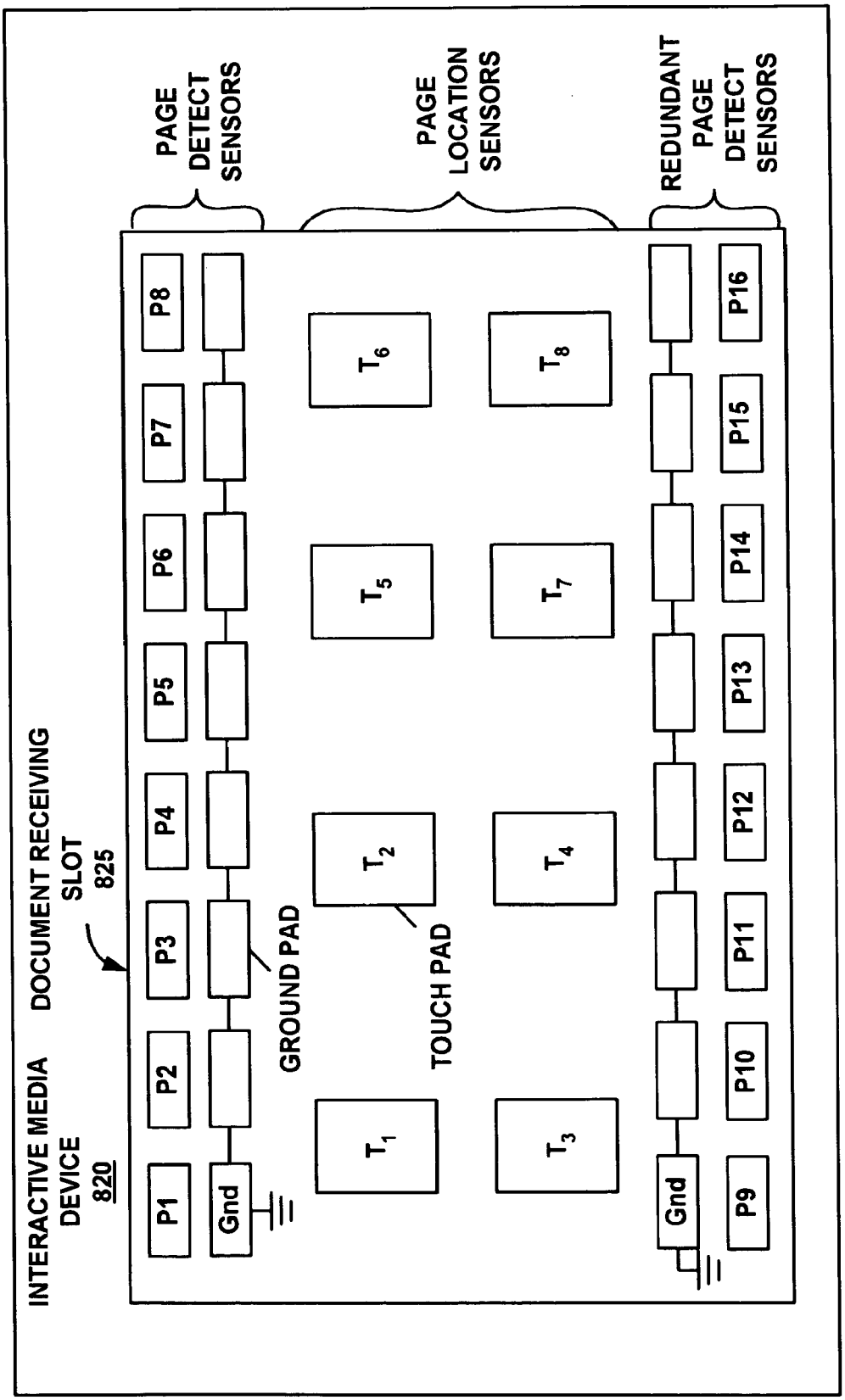
FIG. 12 is an exemplary capacitive sensor array having sensors for both touch points and page marker sensors with redundant page marker sensors, in accordance with an embodiment of the present invention.

FIG. 12 is an exemplary capacitive sensor array having sensors with redundant page marker sensors, in accordance with an embodiment of the present invention. It is possible that a user such as a child might cause a false page identification by coming into close proximity to the (non-redundant) page detect sensors. The redundant page detect sensors operate similarly to the (non-redundant) page detect sensors. However, by analyzing the readings from both the redundant and non-redundant page detect sensors, false reading can be reduced.

Figure 13:
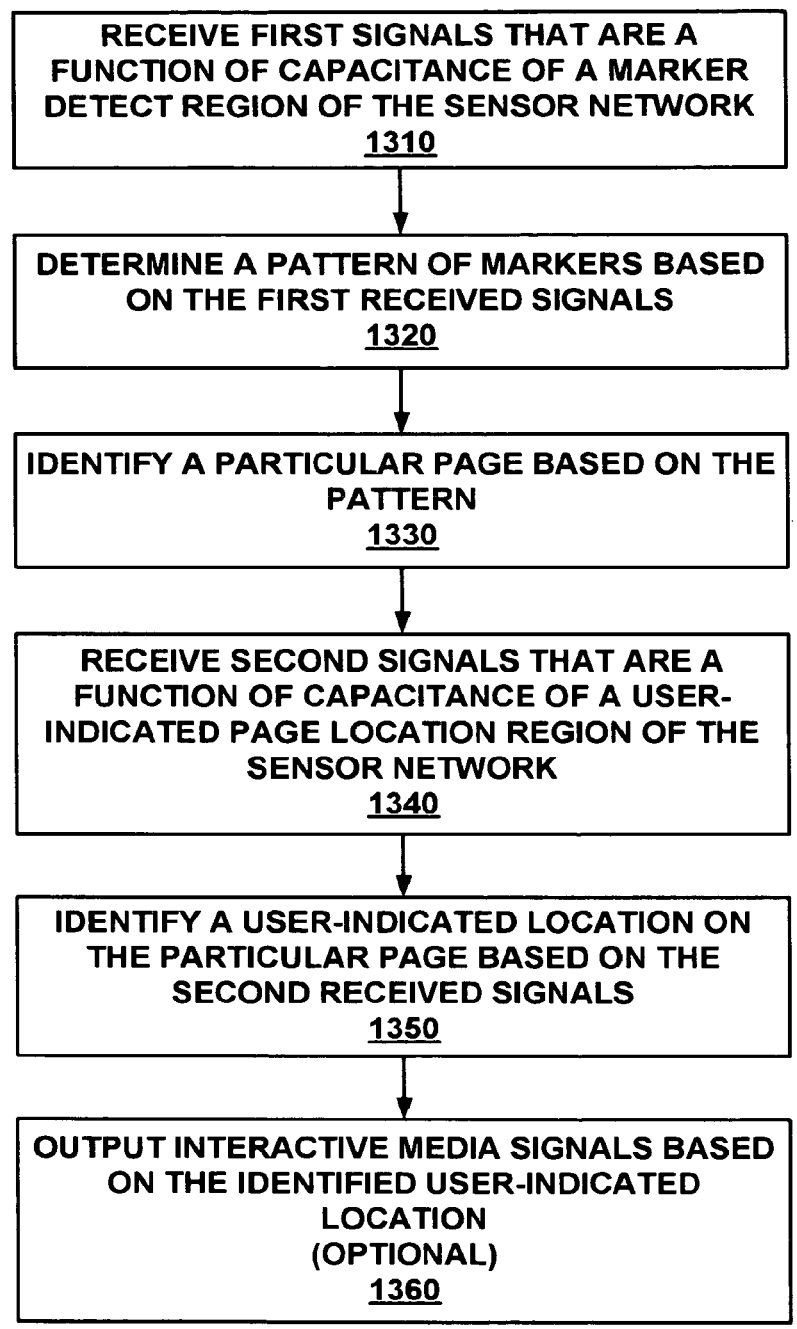
FIG. 13 is a flowchart illustrating steps of a process of joint page detect and page location identification, in accordance with an embodiment of the present invention.

FIG. 13 is a flowchart illustrating steps of a computer-implemented process of joint page detect and page location identification, in accordance with an embodiment of the present invention. In step 1310, first signals that are a function of capacitance of a marker detect region of a sensor network are received from a sensor network by a processor. For example, each signal is a voltage that is a function of the capacitance associated with one sensor.

In step 1320, a pattern of page markers embedded on or disposed on the document is determined by the processor based on the first received signals. The processor has access to stored patterns that define what page is facing the user. In step 1330, a particular page of the document is identified by the processor based on the determined pattern. For example, the determined pattern is matched with the stored patterns.

In step 1340, second signals that are a function of capacitance of a user-indicated page location region of the sensor network. The second signals are indicative of user proximity to a particular sensor in the second region. For example, a capacitance associated with the particular sensor changes when a user is close by. The processor detects this change by the voltage level of a signal received from the particular sensor. In step 1350, the user-indicated location is determined in the multi-page document based on the second received signals.

In optional step 1360, interactive media signals are output based on the identified user-indicated location. For example, audio or visual signals are output based on the user touching a symbol in the document.

Figure 14A:
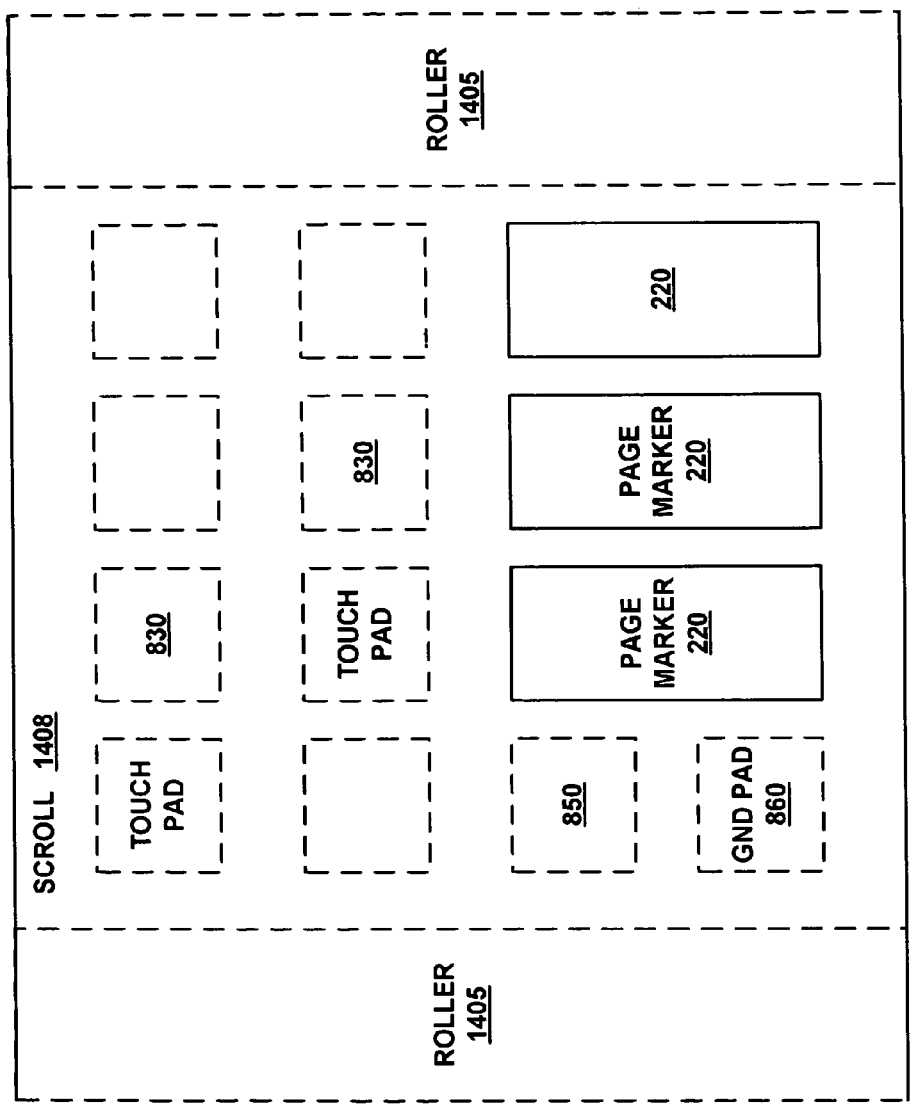
FIG. 14A is a top perspective view of a scroll document overlaying an exemplary sensor network, in accordance with an embodiment of the present invention.

FIG. 14A is a top perspective view of a scroll document overlaying an exemplary sensor network, in accordance with an embodiment of the present invention. The rollers 1405 are used to move the scroll document 1408, such that different areas of the scroll 1408 are viewable. Moreover, a user may touch or nearly touch the scroll 1408 to trigger an interactive media experience. The sensor network has a region with touch pads 830 to sense user proximity. The user may form a path from a touch pad 830 to ground.

The page markers 220 disposed on or embedded in the scroll 1408 are detected by the page detect sensor. The page detect sensor may be at any convenient location in the interactive media device. Typically, the page detect sensor is in a location that a user will not affect by touching the surface of the scroll. In this embodiment, the page detect sensor comprises a transmit/receive pad 850 and a ground pad 860. Alternatively, the page detect sensor may comprise a transmit pad and a receive pad. There may be multiple page detect sensors.

Figure 14B:
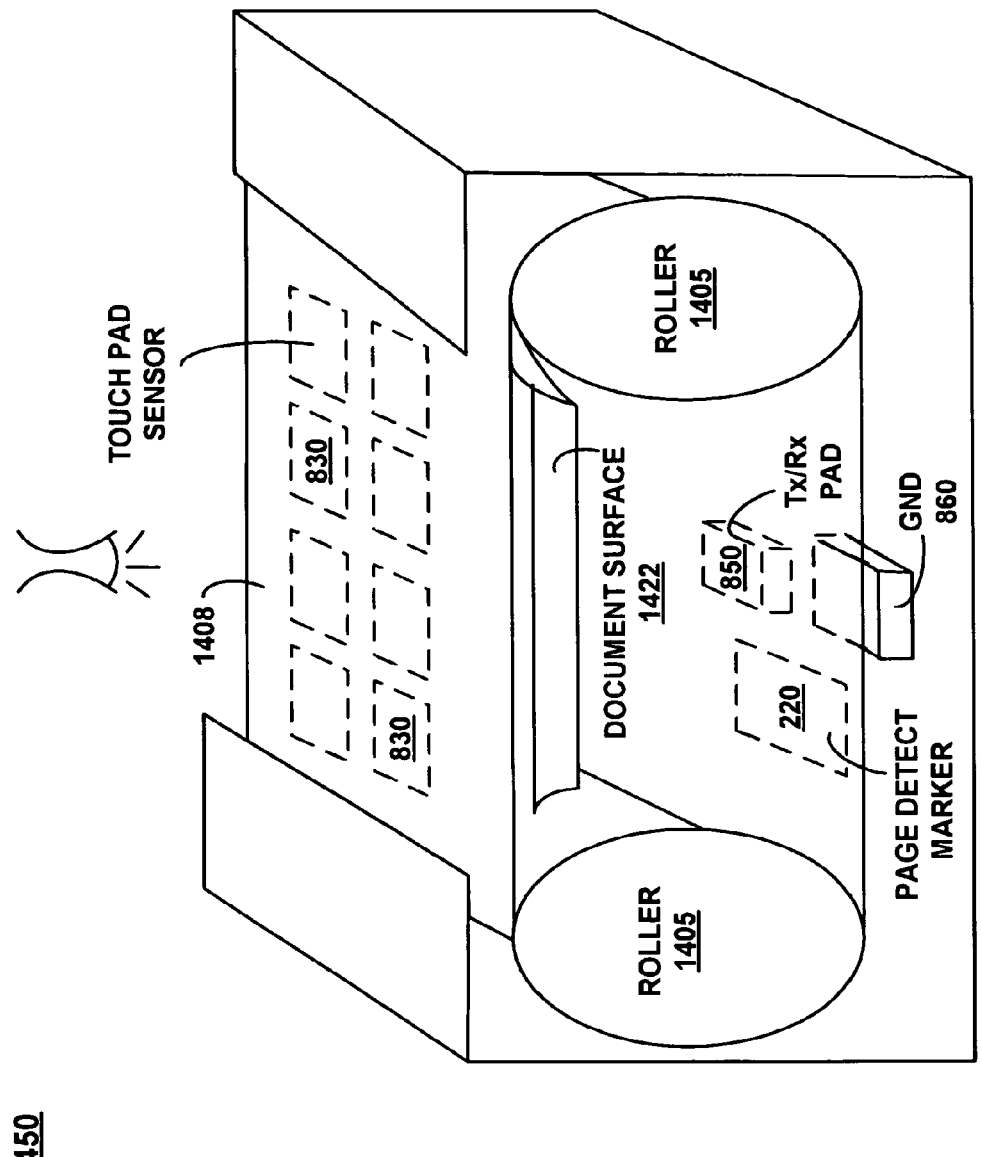
FIG. 14B is a side perspective view of an exemplary scroll platform, in accordance with an embodiment of the present invention

FIG. 14B is a side perspective view of an exemplary scroll platform 1450, in accordance with an embodiment of the present invention. The touch pad sensors 830 are positioned just beneath the surface of the scroll 1408 for detection of user proximity to the scroll surface. The scroll 1408 can rest on the document surface 1422, which can house the touch pad sensors 830. The page detect sensor is located away from the exposed document surface, in order to reduce false readings from user contact. Further, the page marker 200 can be located on a portion of the scroll 1408 that does not come into close proximity to the touch pad sensors 830, in order to avoid a false reading. In this embodiment, the marker detect sensor includes a transmit/receive pad 850 and a corresponding ground pad 860. However, other marker detect sensor configurations can be used.

The preferred embodiment of the present invention, interactive media device using capacitive sensing array for joint page identification and page location determination, are thus described. While the present invention has been described in particular embodiments, it should be appreciated that the present invention should not be construed as limited by such embodiments, but rather construed according to the below claims.

We claim:

1. An apparatus for detecting information related to a document, said apparatus comprising:
   a sensor array for generating signals used to identify a facing page of said document and also used to detect user proximity to a location of said facing page; and
   a processor coupled to receive said signals and, in response thereto, for automatically identifying said facing page and said location.

2. An apparatus as described in claim 1 wherein each sensor of said sensor array is responsive to changes in capacitance thereof.

3. An apparatus as described in claim 1 wherein said sensor array comprises a first plurality of sensors responsive to markers associated with pages of said document and wherein said first plurality of sensors generates signals used to identify said facing page.

4. An apparatus as described in claim 3 wherein said sensor array further comprises a second plurality of sensors responsive to user proximity thereto and wherein said second plurality of sensors generates signals used to identify said location.

5. An apparatus as described in claim 1 further comprising a surface for receiving said document and wherein said sensor array is located in close proximity to said surface.

6. An apparatus for joint detection of a facing page of a document and a user-indicated location on said facing page, said apparatus comprising:
   a surface for receiving said document;
   a plurality of sensors for detecting user proximity to at least one of the sensors and for detecting markers disposed on or embedded in said document; and
   a processor coupled to said sensors for reading signals output from said sensors and for identifying said facing page based on a pattern of said markers and for identifying said user-indicated location on said facing page based on said at least one sensor.

7. An apparatus as described in claim 6 wherein said processor identifies said facing page in response to a detected change in capacitance as signaled by a first group of said plurality of sensors.

8. An apparatus as described in claim 7 wherein said processor identifies said user-indicated location in response to a detected change in capacitance as signaled by a second group of said plurality of sensors.

9. An apparatus as described in claim 7 wherein said first group of sensors comprise variable capacitors and wherein a capacitance of each variable capacitor changes responsive to proximity of an individual marker.

10. An apparatus as described in claim 7 wherein each page of said pages of said document has an associated unique facing-page pattern of markers as detected by said plurality of sensors.

11. An apparatus as described in claim 6 wherein said processor identifies said user-indicated location in response to a detected change in capacitance as signaled by a second group of said plurality of sensors.

12. An apparatus as described in claim 6 wherein said second group of sensors comprise variable capacitors and wherein a capacitance of each variable capacitor changes responsive to proximity of user.

13. An apparatus as described in claim 6 wherein said markers are conductive.

14. An apparatus as described in claim 6 wherein said markers are printed on individual pages of said document.

15. An apparatus as described in claim 6 wherein said markers are embedded within individual pages of said document.

16. An apparatus as described in claim 6 wherein said document is a scroll comprising a plurality of pages disposed linearly therein.

17. An apparatus as described in claim 6 wherein said document is a bound book comprising a binding.

* * * * *